(12) United States Patent
Xiao et al.

(10) Patent No.: US 12,248,632 B2
(45) Date of Patent: Mar. 11, 2025

(54) VIBRATIONAL INPUT ELEMENTS

(71) Applicant: Snap Inc., Santa Monica, CA (US)

(72) Inventors: Chang Xiao, New York, NY (US);
Karl Bayer, New York, NY (US);
Shree K. Nayar, New York, NE (US);
Changxi Zheng, New York, NY (US)

(73) Assignee: Snap Inc., Santa Monica, CA (US)

( * ) Notice: Subject to any disclaimer, the term of this patent is extended or adjusted under 35 U.S.C. 154(b) by 801 days.

(21) Appl. No.: 17/470,665

(22) Filed: Sep. 9, 2021

(65) Prior Publication Data

US 2022/0004260 A1 Jan. 6, 2022

Related U.S. Application Data

(62) Division of application No. 16/832,630, filed on Mar. 27, 2020, now Pat. No. 11,126,266.

(60) Provisional application No. 62/826,581, filed on Mar. 29, 2019.

(51) Int. Cl.
| | |
|---|---|
| *B06B 1/00* | (2006.01) |
| *G01H 11/00* | (2006.01) |
| *G01H 17/00* | (2006.01) |
| *G06F 3/01* | (2006.01) |
| *H02K 33/02* | (2006.01) |
| *B06B 1/04* | (2006.01) |

(52) U.S. Cl.
CPC ............... *G06F 3/016* (2013.01); *B06B 1/00* (2013.01); *G01H 11/00* (2013.01); *G01H 17/00* (2013.01); *H02K 33/02* (2013.01); *B06B 1/045* (2013.01); *G06F 2203/014* (2013.01)

(58) Field of Classification Search
CPC .... B06B 1/00; B06B 1/02; B06B 1/04; B06B 1/10; B06B 1/12; B06B 1/14; B06B 1/16; B06B 1/161
See application file for complete search history.

(56) References Cited

U.S. PATENT DOCUMENTS

| | | | |
|---|---|---|---|
| 2005/0227831 A1* | 10/2005 | Mills ................... | A63B 21/075 482/106 |
| 2011/0025479 A1 | 2/2011 | Hwang et al. | |
| 2011/0159958 A1 | 6/2011 | Miura et al. | |
| 2011/0308923 A1* | 12/2011 | Garcia .................... | H01H 3/10 200/11 R |
| 2013/0274668 A1* | 10/2013 | Barrow-Williams ....... | A61M 5/2033 604/136 |
| 2018/0356892 A1 | 12/2018 | Shim et al. | |

OTHER PUBLICATIONS

"U.S. Appl. No. 16/832,630, Examiner Interview Summary mailed Feb. 22, 2021", 2 pgs.

(Continued)

*Primary Examiner* — Benyam Haile
(74) *Attorney, Agent, or Firm* — Schwegman Lundberg & Woessner, P.A.

(57) ABSTRACT

Systems and methods are provided that relate to vibrational input elements configured to provide inputs to control an application executed by a mobile computing device. The vibrational input elements may produce distinct vibration patterns that are detectable by a sensor of the mobile computing device. The respective vibration patterns may correspond to one or more actions that may be performed in relation to the application.

18 Claims, 21 Drawing Sheets

(56) References Cited

OTHER PUBLICATIONS

"U.S. Appl. No. 16/832,630, Final Office Action mailed Mar. 3, 2021", 12 pgs.
"U.S. Appl. No. 16/832,630, Non Final Office Action mailed Nov. 18, 2020", 11 pgs.
"U.S. Appl. No. 16/832,630, Notice of Allowance mailed May 18, 2021", 8 pgs.
"U.S. Appl. No. 16/832,630, Response filed Feb. 18, 2021 to Non Final Office Action mailed Nov. 18, 2020", 12 pgs.
"U.S. Appl. No. 16/832,630, Response filed May 3, 2021 to Final Office Action mailed Mar. 3, 2021", 12 pgs.
U.S. Appl. No. 16/832,630 U.S. Pat. No. 11,126,266, Mar. 27, 2020, Vibrational Input Elements.

* cited by examiner

VIBRATIONAL INPUT ELEMENTS

PRIORITY CLAIM AND INCORPORATION BY REFERENCE

This application is a division of U.S. patent application Ser. No. 16/832,630, filed Mar. 27, 2020, which application claims priority to U.S. Provisional Patent Application Ser. No. 62/826,581, filed on Mar. 29, 2019, and entitled "Vibrational Input Elements", which are incorporated by reference herein in their entireties.

BACKGROUND

Mobile computing devices tend to have a standard set of input devices and sensor features, such as a touch screen display and various location and movement sensors. Some mobile computing devices may or may not have physical buttons, but such buttons are fixed and have limited versatility due to the size constraints, power constraints, and other such limitations of mobile computing devices. Some "peripheral" devices are available to provide extended input functionality to mobile computing devices. Such devices either use physical electrical input ports (e.g. Universal Serial Bus or headphone jack inputs) or wireless communications. For physical connections, the actual process of connecting the mobile computing device to a port may cause problems, and is a possible point of failure. For both wired and wireless connections of these types, significant power may be required to provide input signals and power features to the peripheral interface and input elements.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
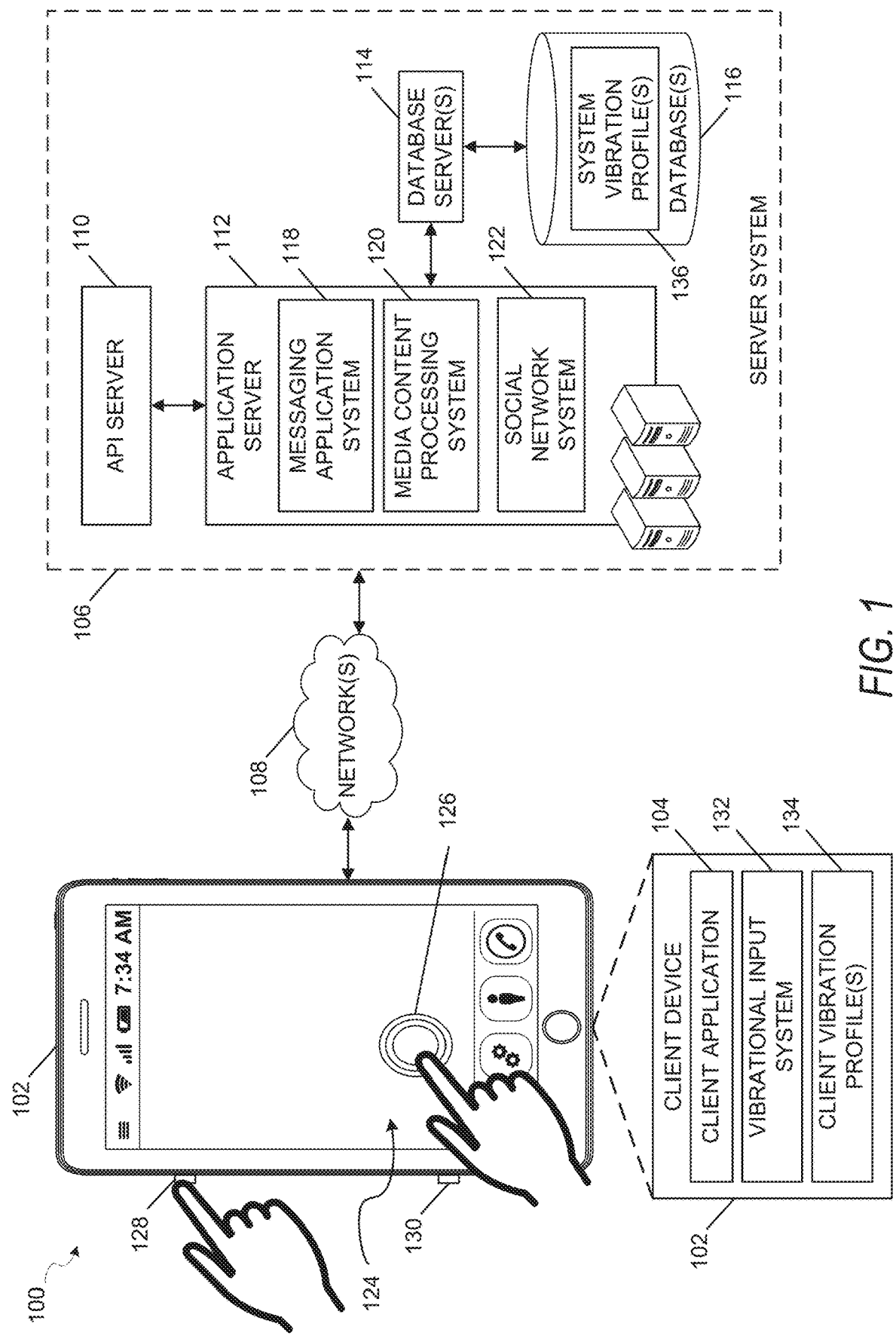
FIG. 1 is an illustration of an environment in which a mobile computing device may be used with vibrational input elements, in accordance with one or more example embodiments.

Systems and methods described herein relate to vibrational input elements configured to provide input to control a mobile computing device by creating distinct vibration patterns that are detectable by a sensor of the mobile computing device. While particular embodiments are described herein, it will be apparent that additional systems and methods are possible within the scope of the present innovations other than the embodiments specifically described.

Many mobile computing devices such as cell phones and tablets include motion sensors (e.g. accelerometers) which handle axis-based motion sensing. Embodiments described herein include physical vibrational input elements, as well as systems to detect vibrations produced by the activation of the vibrational input elements and to translate the vibrations into responsive software or user interface actions taken by a mobile computing device (e.g., a smartphone). One type of vibrational input element is a button-element, which creates a distinct vibration as a button is pushed and released. The vibration is detected by an accelerometer, and the detected signal is passed to a system that associates the distinct vibration with the button action (e.g., the press and release) to determine that the button has been pressed and/or released. The system then initiates an activity in software on the computing device based on the detected button action. Such actions may include selections within a user interface, output of sound as part of a virtual musical instrument using the computing device, or any action which a computing device may associate with such a detected vibration. Multiple buttons may be used with a single computing device by configuring different button elements to generate distinguishable vibrations. Such buttons may be passive elements requiring no electrical power, but using internal springs or another type of mechanical component, such as a hydraulic or pneumatic cylinder, etc., that can repeatably move in a known measurable manner. Any such buttons attached to a computing device may be calibrated in various ways to determine how the distinct mechanical movements or vibrations related to the button are sensed by one or more sensors of the computing device, such as one or more accelerometers, and to account for changes in the vibration patterns over time due to wear on the components of such passive vibrational elements.

Another example of a vibrational input element is a gear or wheel element. Similar to the button element described above, turning the wheel element generates distinct vibrations which are detectable by a computing device having one or more sensors, such as one or more accelerometers. In some such systems, an accelerometer is sufficiently sensitive to distinguish vibrations from the same wheel element as the wheel is being turned in different directions. For example, vibrations sensed from a wheel turned in a first direction may be used to initiate a zoom-in action in a user interface, and distinct vibrations sensed from turning the wheel in a second direction opposite from the first direction may initiate a zoom-out action in the user interface.

Software of a computing device may be calibrated not only to identify distinct vibrations from different vibrational elements attached to the same computing device, but to identify different vibrations which occur from the same element depending on the position in which a user is holding the computing device. For example, a first vibrational element activated using a one-handed hold position may produce a different vibration than when the computing device is held using two hands. Various systems may be structured to identify that a vibration is coming from the same vibrational input element regardless of the hold position, or may be configured to generate different actions from the same vibrational input element depending on how the computing device is being held. Any such actions may be configurable as part of computing device operations to perform actions based on vibrations created using vibrational input elements, as described herein.

FIG. 1 is an illustration of an environment 100 in which a mobile computing device may be used with vibrational input elements, in accordance with one or more example embodiments. The environment 100 may include a client device 102 that may host a number of applications, such as a client application 104. The client device 102 may include a mobile computing device, such as a smartphone, a tablet computing device, a portable gaming device and the like, in some implementations. The client application 104 may be communicatively coupled to other instances of the client application 104 and to a server system 106 via one or more networks 108.

The client application 104 may be able to communicate and exchange data with another instance of client application 104 and with the server system 106 via the one or more network 108. The data exchanged between the client application 104, and between another instance of the client application 104 and the server system 106 may include functions (e.g., commands to invoke functions) as well as payload data (e.g., text, audio, video or other multimedia data).

The server system 106 provides server-side functionality via the one or more networks 108 to a particular client application 104. While certain functions of the environment 100 are described herein as being performed by either the client application 104 or by the server system 106, the location of certain functionality either within the client application 104 or the server system 106 is a design choice. For example, it may be technically preferable to initially, deploy certain technology and functionality within the server system 106, but to later migrate this technology and functionality to the client application 104 where a client device 102 has a sufficient processing capacity.

The server system 106 supports various services and operations that are provided to the client application 104. Such operations include transmitting data to, receiving data from, and processing data generated by the client application 104. This data may include at least one of text content, video content, audio content, image content, message content, client device information, geolocation information, media annotation and overlays, message content persistence conditions, social network information, and live event information, as examples. Data exchanges within the environment 100 may be invoked and controlled through functions available via user interfaces (UIs) of the client application 104.

Turning now specifically to the server system 106, an Application Program Interface (API) server 110 is coupled to, and provides a programmatic interface to, an application server 112. The application server 112 is communicatively coupled to a database server 114, which facilitates access to one or more databases 116 in data associated with content processed by the application server 112 is stored.

The Application Program Interface (API) server 110 receives and transmits content data (e.g., commands and content payloads) between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112, including account registration, login functionality, the sending of messages, via the application server 112, from one instance of the client application 104 to another instance of the client application 104, the sending of media files (e.g., images or video) from one instance of the client application 104 to the messaging application system 118, and for possible access by another instance of the client application 104, the setting of a collection of media data (e.g., story), the retrieval of a list of contacts of a user of a client device 102, the retrieval of such collections, the retrieval of messages and content, the adding and deletion of contacts to a social graph, the location of contacts within a social graph, and opening an application event (e.g., relating to the client application 104).

The application server 112 hosts a number of applications and subsystems, including a messaging application system 118, a media content processing system 120, and a social network system 122. The messaging application system 118 implements a number of message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available, by the messaging application system 118, to the client application 104. Other processor and memory intensive processing of data may also be performed server-side by the messaging application system 118, in view of the hardware requirements for such processing.

The application server 112 also includes a media content processing system 120 that is dedicated to performing various media content processing operations, typically with respect to images or video received within the payload of a content, such as a message at the messaging application system 118.

The social network system 122 supports various social networking functions services, and makes these functions and services available to the messaging application system 118. To this end, the social network system 122 maintains and accesses an entity graph within the one or more databases 116. Examples of functions and services supported by the social network system 122 include the identification of other users of the client application 104 with which a particular user has relationships or is "following", and also the identification of other entities and interests of a particular user.

The client device 102 may include a mobile computing device executing a mobile operating system (e.g., IOS™, ANDROID™, WINDOWS® Phone, or other mobile operating systems), consistent with some embodiments. In various embodiments, one or more vibrational input elements may be integrated directly into the body of the client device 102. Additionally, vibrational input elements may be disposed in a cover or case that is coupled to the body of the client device 102 such that vibrations from the vibrational input elements are transmitted in a distinct fashion to one or more sensors of the client device 102. The client device 102 may implement a software architecture described herein in certain embodiments, which may be used to determine when vibrations are received from a vibrational input element, and to take actions (e.g. user interface actions or audio output actions) in response to a sensed vibration. In some embodiments, the client device 102 includes a touchscreen with a display area 124. The touchscreen is operable to receive tactile data from a user, or other inputs such as motion sensors, cameras, etcetera. These inputs may be used to provide commands to control and manipulate user interfaces or software elements in accordance with embodiments described herein. For example, a region 126 of the display area 124 may correspond to a user interface element that is selectable by a touch input from a user to perform one or more operations.

The client device 102 of FIG. 1 may also present a user interface in the display area 124, with the user interface at least partially controllable using vibrational input elements. To illustrate, the client device 102 may be coupled with a first vibrational input element 128 and a second vibrational input element 130. Actuation of the first vibrational input element 128 and/or the second vibrational input element 130 may cause vibrations to take place. The vibrations may be detected by one or more sensors of the client device 102. The client device 102 may include a vibrational input system 132 that interprets the vibrations detected by one or more sensors of the client device 102. The vibrational input system 132 may determine a pattern of vibrations based on data obtained from one or more sensors of the client device 102 in response to actuation of at least one of the first vibrational input element 128 or the second vibrational input element 130. The vibrational input system 132 may analyze the pattern of vibrations with respect to one or more vibration profiles. The one or more vibration profiles may correspond to previously determined vibration patterns for one or more vibrational input elements. The one or more vibration profiles may also indicate one or more operations that correspond to actuation of each vibrational input element. In various examples, at least a portion of the vibration profiles may correspond to a same vibrational input element being actuated in a different manner, such as counterclockwise and clockwise rotation of a wheel vibrational input element.

In one or more illustrative examples, the vibrational input system 132 may determine a measure of similarity between vibrations produced by actuation of a vibrational input element 128, 130 and one or more vibration profiles. In situations where the measure of similarity is greater than a threshold measure of similarity with respect to a particular vibration profile, the vibrational input system 132 may determine that the vibrations detected by one or more sensors of the client device 102 correspond to the vibrational input element related to the particular vibration profile. The vibrational input system 132 may then cause one or more applications, such as the client application 104, to perform one or more operations associated with actuation of the vibrational input element. In additional examples, the vibrational input system 132 may determine measures of similarity between a vibration pattern produced by actuation of at least one of the vibrational input elements 128, 130 and a plurality of vibration profiles. The vibrational input system 132 may determine the measure of similarity having a greatest value and determine that actuation has taken place with respect to the vibrational input element corresponding to the vibration profile that has a greatest amount of similarity with the vibration pattern detected by the one or more sensors of the client device 102.

At least a portion of the one or more vibration profiles analyzed by the vibrational input system 132 may be stored by the client device 102 as client vibration profiles 134. Additionally, at least a portion of the one or more vibration profiles analyzed by the vibrational input system 132 may be obtained from the server system 106 and stored as system vibration profiles 136 in the database 116. The vibration profiles 134, 136 may indicate sensor data that corresponds to the actuation of one or more vibrational input elements. For example, the vibration profiles 134, 136 may correspond to sensor data generated by one or more sensors of one or more client devices in response to actuation of a button vibration input element. In additional examples, the vibration profiles 134, 136 may correspond to sensor data generated by one or more sensors of one or more client devices in response to activation of a wheel vibration input element. In various examples, the client vibration profiles 134 and/or the system vibration profiles 136 may correspond to sensor data indicating patterns of vibration generated in response to actuation of the vibrational input elements coupled to the client device 102, such as the first vibrational input element 128 and the second vibrational input element 130. In one or more illustrative examples, the vibrational input system 132 may cause a calibration procedure to take place to associate actuation of each vibrational input element 128, 130 and/or actuation of a combination of the vibrational input elements 128 and 130 with a respective vibration pattern. The one or more vibration patterns determined as part of the calibration process may be included in the client vibration profiles 134 and/or the system vibration profiles 136.

In one or more embodiments, the calibration process may be performed periodically. In additional embodiments, the calibration process may be performed in response to determining an amount of change in the vibrations produced by at least one of the first vibrational input element 128 or the second vibrational input element 130 over a period of time. For example, as the vibrational input elements 128, 130 are used over time, the vibrations produced by the vibrational input elements 128, 130 may change. The vibrational input system 132 may detect an amount of change of the vibrations produced by at least one of the vibrational input elements 128, 130. In situations where the amount of change is greater than a threshold amount of change, the vibrational input system 132 may cause a calibration procedure to take place.

Many varieties of applications (also referred to as "apps") can be executing on the client device 102, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the client device 102 may include a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In various embodiments, systems may be provided to control some portion of any such apps using vibrational input elements, as described herein.

Figure 2:
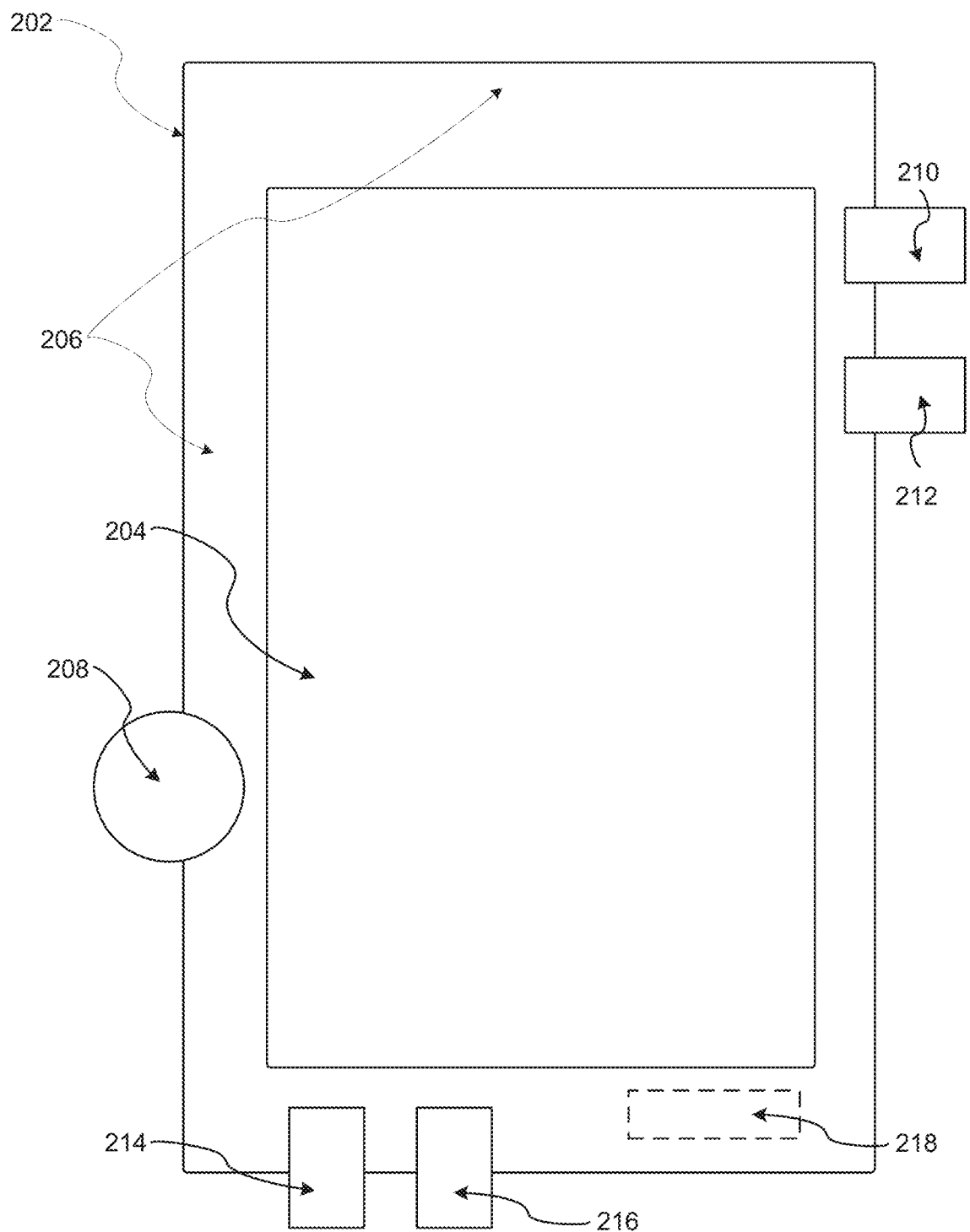
FIG. 2 illustrates modular aspects of vibrational input elements which may be used with a mobile computing device, in accordance with one or more example embodiments.

FIG. 2 illustrates a device 202 with a display area 204. Area 206 may include a housing for vibrational input elements that may comprise either a case surrounding the device 202 or be integrated with a body of the device 202. In either embodiment, vibrational input elements 208, 210, 212, 214, 216 are positioned in area 206. Vibrational input elements 208, 210, 212, 214, 216 are physically coupled to device 202 such that vibrations generated by actuation of one or more of the vibrational input elements 208, 210, 212, 214, 216 are transmitted through the physical components of device 202 (e.g., such as through the casing, body of the device 202, one or more electronic boards, dedicated vibration pathways, etc.) to a sensor 218. In one or more illustrative examples, the sensor 218 may include an accelerometer that detects the vibrations. In the embodiment of FIG. 2, vibrational input elements 210, 212, 214, 216 are button elements, and vibrational input element 208 is a gear or wheel vibrational input element. Additional details of button elements are described below, with one example illustrated in FIG. 44. Wheel elements are also described below, with one example illustrated in FIG. 7A. Device 202 of FIG. 2 shows an example with five vibrational input elements 208, 210, 212, 214, 216 in specific positions, however, any number of button vibrational input elements and any number of wheel vibrational input elements may be integrated with a single device with the vibrational input elements in any position, so long as the movements or vibrations generated by such vibrational input elements are able to be distinguished by the system a vibrational control system or application that processes and interprets signals received at an accelerometer of the device 202).

Figure 3B:
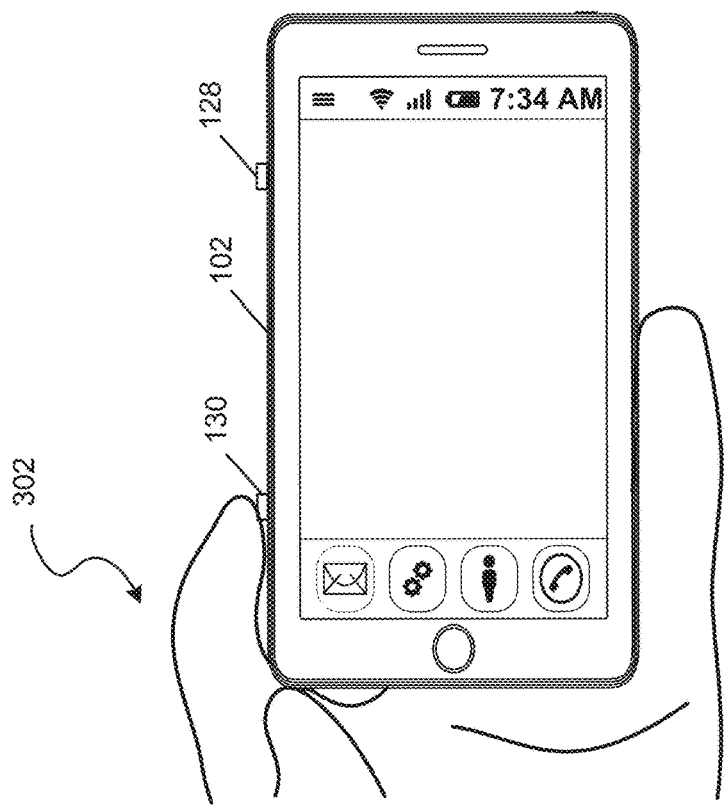
FIG. 3B illustrates actuation of the vibrational input element in a second hold position, in accordance with one or more example embodiments.
Figure 3A:
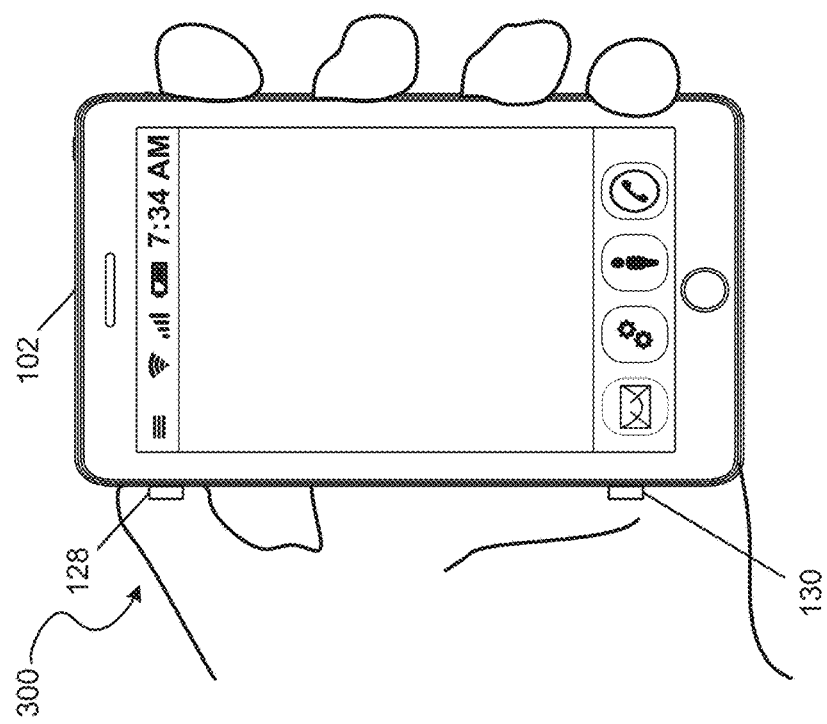
FIG. 3A illustrates actuation of a vibrational input element in a first hold position, in accordance with one or more example embodiments.

FIG. 3A illustrates the example client device 102 having the vibrational input elements 128, 130 in a first hold position 300. FIG. 3B illustrates the example client device 102 having the vibrational elements 128, 130 in a second hold position 302. Actuation of vibrational input elements 128, 130 in different hold positions may cause different vibration patterns. In various examples, the different vibration patterns may be associated with different operations to be performed by the client device 102. For example, actuation of the second vibrational input element 130 in the first hold position 300 may cause a first operation to be performed by the client device 102. In addition, actuation of the second vibrational element 130 in the second hold position 302 may cause a second operation to be performed by the client device 102.

Figure 4B:
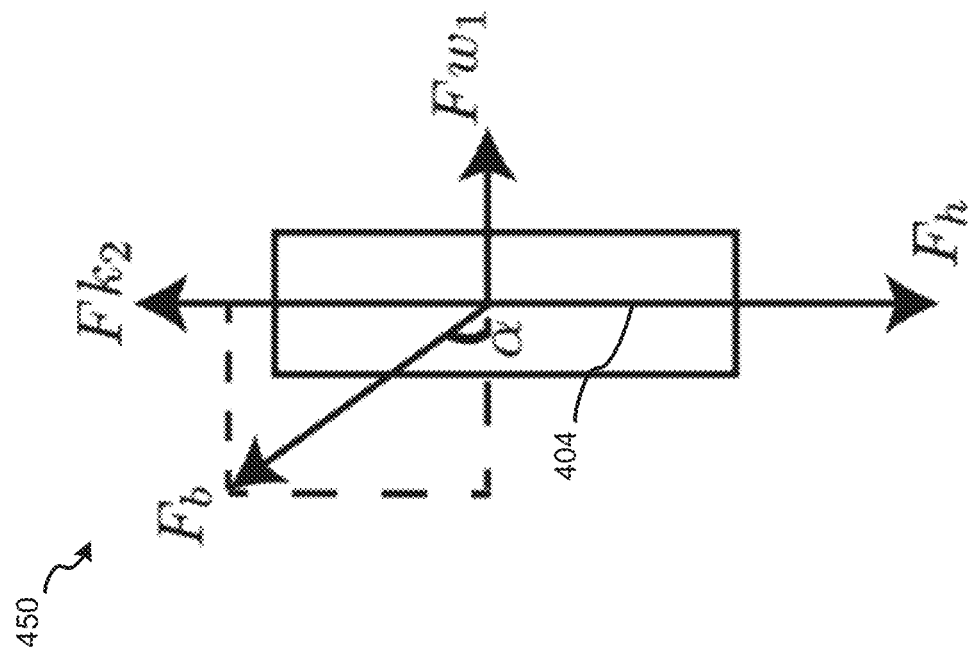
FIG. 4B shows a simplified model of the forces acting on the body of a button vibrational input element, in accordance with one or more example embodiments.
Figure 4A:
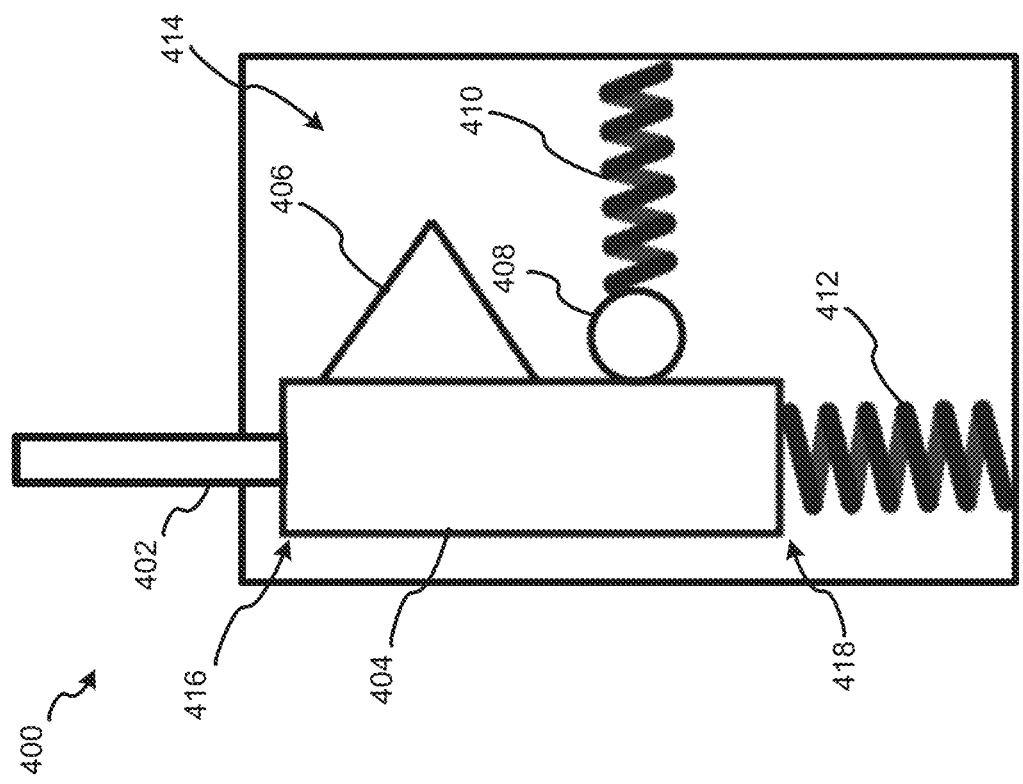
FIG. 4A illustrates aspects of a button vibrational input element, in accordance with one or more example embodiments.

FIG. 4A illustrates aspects of an example push button vibrational input element 400 that can be used to provide input to a client device. Vibrational input element 400 may be embedded within a body of a client device, such as the client device 102 of FIG. 1 or the device 202 of FIG. 2. In additional examples, the vibrational input element 400 may be part of a case which is used as a device attachment or as a protective case for a client device. In the illustrative example of FIG. 4A, a housing for the vibrational input element 400 is not shown.

Vibrational input element 400 includes a button 402, a body 404, a vibration structure 406, a vibration weight 408, a vibration spring 410, and a return spring 412. At least the button 402 is exposed outside of a housing for the vibrational input element 400 such that a user may exert a force on the vibrational input element 400 via button 402, which compresses return spring 412. The return spring 412 may be aligned along a same axis as the body 404 and the button 402 of the vibrational input element 400. In one or more examples, the return spring 412 and the vibration spring 410 may be disposed in a substantially perpendicular arrangement.

As return spring 412 is compressed, vibration structure 406 comes into contact with vibration weight 408. The contact between the vibration structure 406 and the vibration weight 408 may activate the vibration spring 410 and produce a distinct vibration. An example of a vibration pattern that may be produced by the activation of the vibration spring 410 may be illustrated in FIG. 4E. The vibration pattern may be detected by a sensor, such as an accelerometer. In a resting state, the vibration weight 408 is below the vibration structure 406. In a pushed position, the vibration weight 408 moves to a position above the vibration structure 406. When a force on button 402 is released, return spring 412 pushes the body 404 and the vibration structure 406 back to a resting position with the vibration weight 408 located below the vibration structure 406. The vibrational input element 400 may be positioned within a cavity 414, such as a sleeve or an open space, within a housing for the vibrational input element 400 such that when the body 404 is actuated, the position and motion of vibration structure 406 and the interaction between the vibration weight 408 and the vibration spring 410 is consistent during different actuations of the vibrational input element 400.

In one or more illustrative examples, the button 402 may be physically connected to the body 404 at a first end 416 of the body 404. The body 404 is abutted at a second end 418 of the body 404 by the return spring 412. The second end 418 may be disposed at least substantially opposite the first end 416. The vibration structure 406 can connect to or can be a part of the body 404. The return spring 412 may physically be connected to a structure of a client device, such as a body of the client device or a case fastened to the body of the client device. The physical and/or mechanical connection between components of the vibrational input element 400 and a client device may not be fixed. For example, vibrational input element 400 may be located within a removable case of a client device. In these scenarios, when the removable case is attached to a client device, the physical coupling between the case and the client device is sufficiently tight to provide a mechanical coupling that results in motion of components of the vibrational input element 400 and/or vibrations generated by actions of springs 410 and 412 that may be detected by a sensor, such as an accelerometer of the client device.

FIG. 4B shows a simplified model 450 of the forces acting on body 404 as part of a button vibrational input element such as the vibrational input element 400 illustrated in FIG. 4A. In this model, Fh is the force exerted on the button 402 by a user (e.g. a user's finger, thumb, or hand). Fw1 is the contact force between the body 404 and a back wall of the cavity 414 opposite the vibration spring 410. Fk2 is the spring force from the return spring 412. Fb is a contact force between the weight 408 and either the vibration structure 406 or the body 404, as generated by the vibration spring 410. The angle of Fb is generated by the contact angle between the vibration weight 408 contacting the body 404 or the vibration structure 406. As part of this model:

$$Fk_2 + F_b \sin \alpha = F_h \quad (1)$$

$$F_b \cos \alpha = Fw_1 \quad (2)$$

Based on characteristics (e.g., shapes, mass, etc.) of the components of the vibrational input element 400, such as the button 402, the body 404, the vibration structure 406, the weight 408, the vibration spring 410, and/or the return spring 412, an output force profile may be estimated for the vibrational input element. In one or more illustrative examples, to generate a vibration pattern that is detectable by at least one sensor, certain designs of the vibrational input element 400 may be implemented. In various examples, a "tooth" or projection shape for the vibration structure 406 may be implemented or a relatively small ball size for the weight 408 may be used. Additionally, the spring constant of the vibration spring 410 and/or the return spring 412 may be configured to produce vibrations with sufficient magnitude to be detected by at least one sensor of a client device. In various examples, the vibration spring 410 may have a spring constant that is different from a spring constant of the return spring 412.

Various design considerations may be taken into account when implementing the characteristics of features of vibrational input elements. For example, at a certain tooth shape, the force required to move a wheel may become excessive for a user. Additionally, some shapes for the vibration structure 406 may make it difficult for the vibration structure 406 to contact a vibration weight. In some illustrative examples, the features of the vibration structure 406 and the weight 408 may be designed such that the interface between the vibration structure 406 and the weight 408 is configured to enable continued motion of the body 404 and the vibration structure 406 when contact is made with the weight 408. In one or more additional examples, a size and shape of the weight 408 may be configured to produce sufficient contact to cause the vibration spring 410 to produce vibrations that are detectable by at least one sensor of a client device. In situations where the weight 408 is overly large, the motion of the vibration structure 406 may be impeded and in situations where the size of the weight 408 is too small, a magnitude of vibrations produced by the vibration spring 410 in response to contact between the vibration structure 406 and the weight 408 may not be sufficient for detection by at least one sensor of a client device. The spring constant for the vibration spring 410 may also be configured to enable motion of the vibration structure 406 past the weight 408 and to produce vibrations having magnitudes that are detectable by at least one sensor of a client device. In situations where the vibration spring 410 is overly resistant to compression, the motion of the vibration structure 406 past the weight 408 may be impeded and in situations where the vibration spring 410 compresses too easily, the vibrations produced by the vibration spring 410 may not be detectable by a sensor of a client device.

Figure 4C:
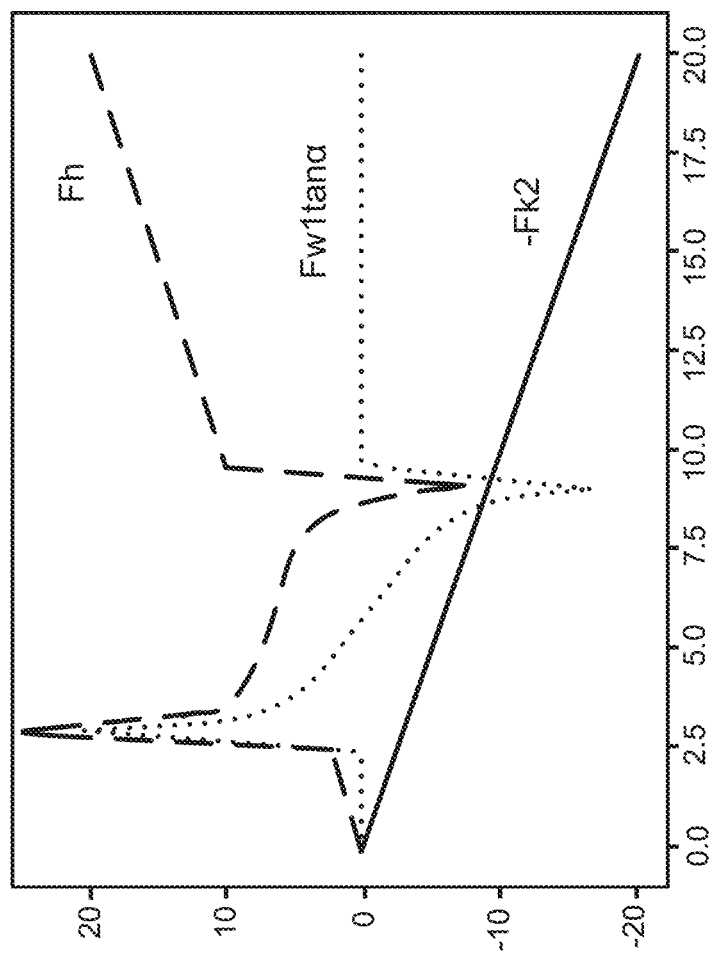
FIG. 4C further illustrates design considerations of the vibration spring in connection with other parts of a push-button vibrational input element, in accordance with one or more example embodiments.

FIG. 4C further illustrates design considerations of the vibration spring 410 in connection with other parts of a push-button vibrational input element. In particular, in situations where the vibration spring 410 has a spring constant indicating a resistance to compression that is too high in comparison to the resistance to compression of the return spring 412, then the force exerted by the return spring 412 after the button 402 is released will not be sufficient to push the body 404 back into a starting/neutral position, and the button 402 will not be configured to operate properly. Similarly, the spring constant of the return spring 412 may be designed to provide resistance levels that can reasonably be offset by force generated from actuation of the vibrational input element 400 by a user.

Figure 4D:
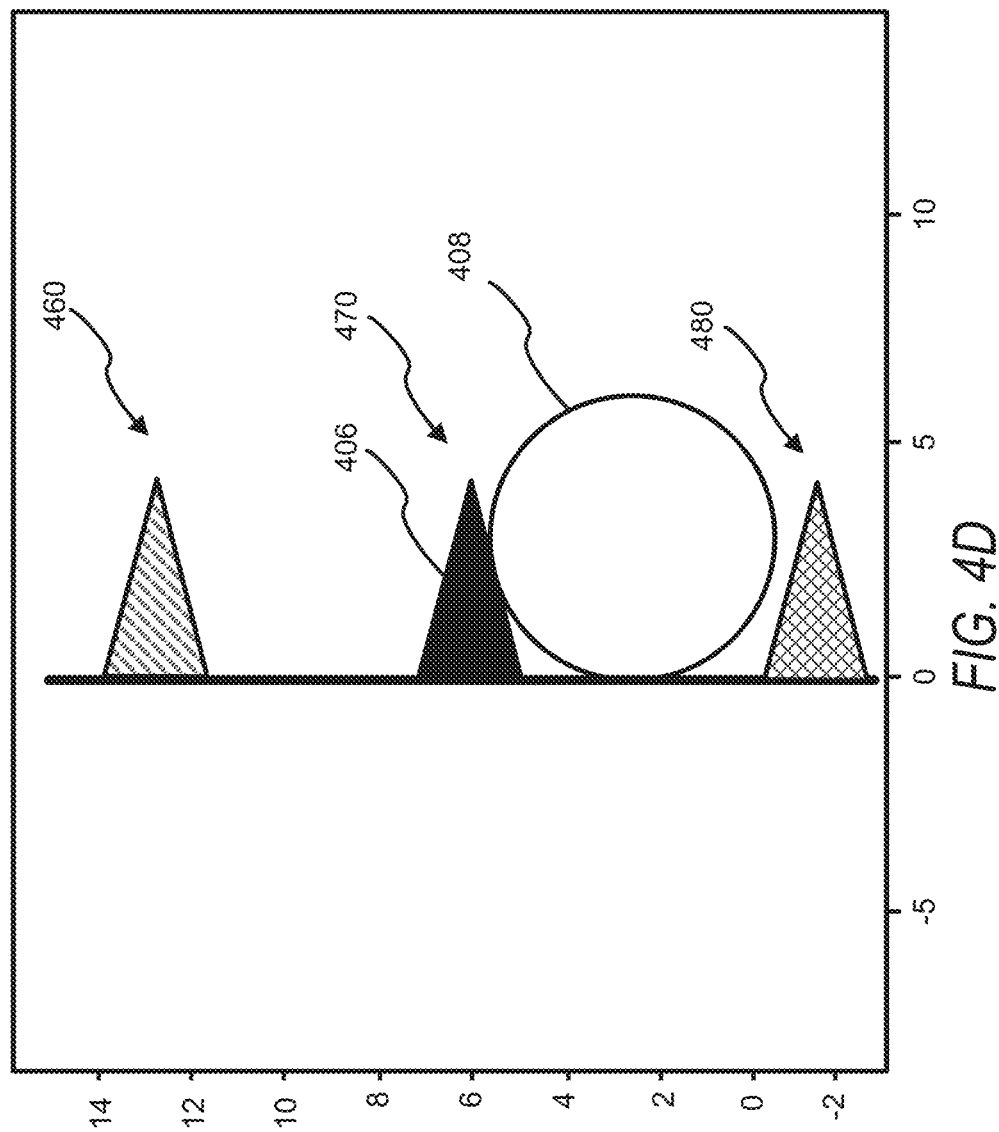
FIG. 4D illustrates an example "tooth" shape for the vibration structure and an associated ball shape for the weight of a button vibrational input element, in accordance with one or more example embodiments.

FIG. 4D illustrates an example "tooth" shape for the vibration structure 406 and an associated ball shape for the weight 408. In scenarios where the vibrational input element 400 is in a neutral or resting state, the vibration structure 406 may be in a first position 460. As a force is applied to the button 402 by a user, the vibration structure 406 may move to a second position 470 in which the vibration structure 406 contacts the weight 408. In various examples, contact between the vibration structure 406 and the weight 408 may cause a vibration. In some embodiments, the vibration structure 406 may move past the weight 408 to a third position 480. In one or more embodiments, the vibration structure 406 may move from the second position 470 to the third position 480 based on compression of the vibration spring 410 as the weight 408 presses against the vibration spring 410 due to force exerted on the button 402 by a user.

Figure 4E:
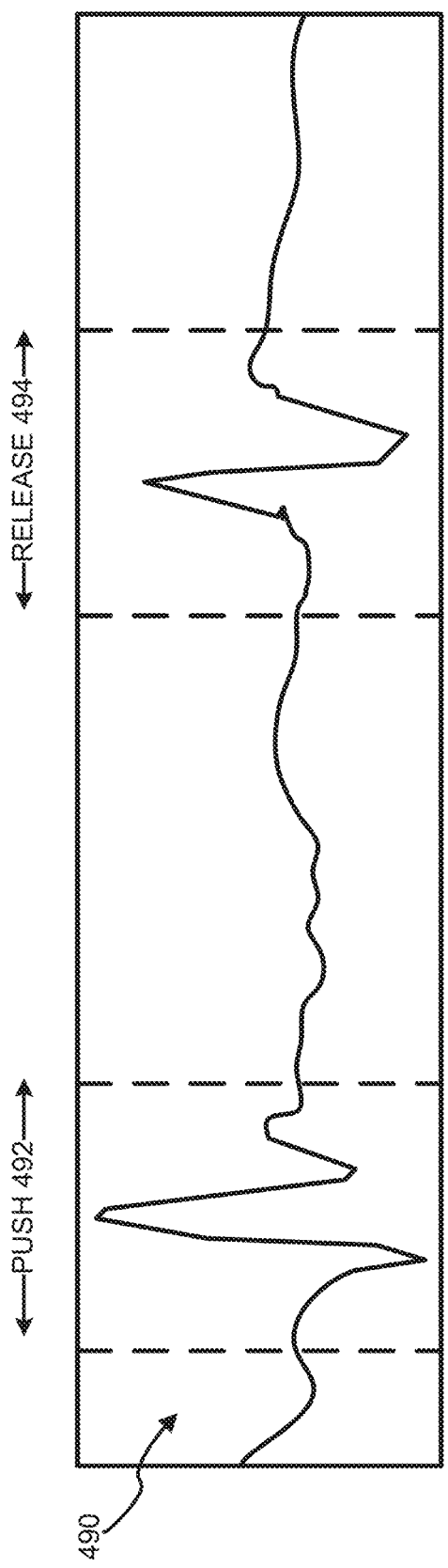
FIG. 4E illustrates an example vibration signal that may be generated by a button vibrational input element, in accordance with one or more example embodiments.

A corresponding vibration signal 490 is illustrated by FIG. 4E. A first portion 492 of the vibration signal 490 may correspond to a push action when a user applies force to the button 402. The first portion 492 of the vibration signal 490 may be distinguished from a second portion 494 of the vibration signal 490 when the button 402 is released and the return spring 412 pushes the button 402 back to a resting position. In example embodiments, the button press action may be designed to allow the force of the return spring 412 to be the primary source of the vibration signal 490 during the release of the button 402, as opposed to an operation where the finger of a user may continue to apply at least some amount of force during the release of the button 402.

Figure 5A:
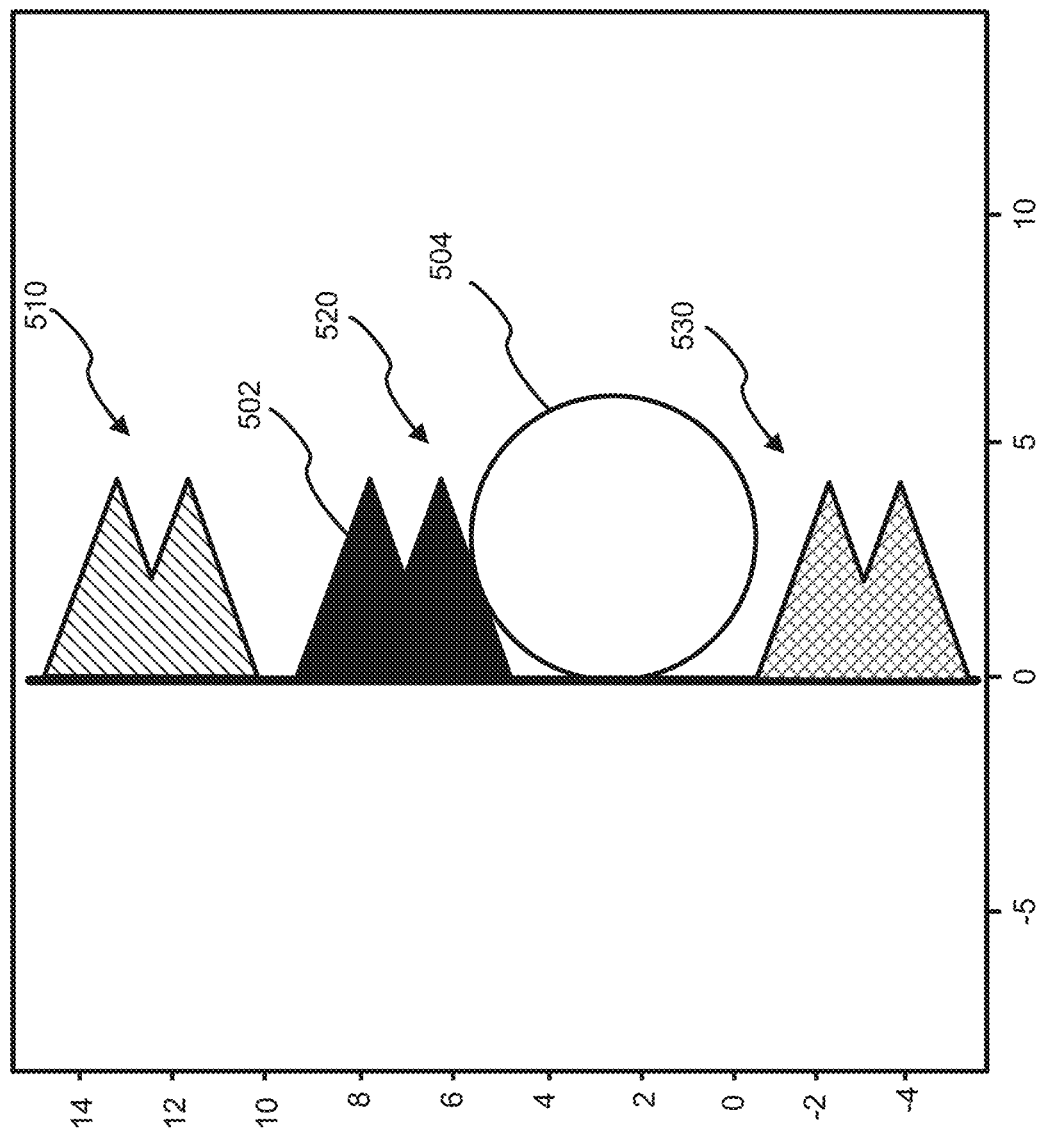
FIG. 5A illustrates another example "tooth" shape for the vibration structure and an associated ball shape for the weight of a button vibrational input element, in accordance with one or more example embodiments.

FIG. 5A illustrates another example "tooth" shape for the vibration structure and an associated ball shape for the weight of a button vibrational input element, in accordance with one or more example embodiments. In particular, FIG. 5A illustrates another shape for a vibration structure 502 that operates in conjunction with a ball-shaped weight 504. The arrangement of the vibration structure 502 and the weight 504 may correspond to the arrangement shown in FIG. 4A with the vibration structure 502 corresponding to the vibration structure 406 and the weight 504 corresponding to the weight 408. In scenarios where the vibrational input element that includes the vibration structure 502 and the weight 504 is in a neutral or resting state, the vibration structure 502 may be in a first position 510. As a force is applied by a user to a button coupled to the vibration structure 502, the vibration structure 502 may move to a second position 520 in which the vibration structure 502 contacts the weight 504. In various examples, contact between the vibration structure 502 and the weight 504 may cause a vibration. In some embodiments, the vibration structure 502 may move past the weight 504 to a third position 530. In one or more embodiments, the vibration structure 502 may move from the second position 520 to the third position 530 based on compression of a vibration spring in contact with the weight 504 as the weight 504 presses against the vibration spring due to force exerted on the button by a user.

Figure 5B:
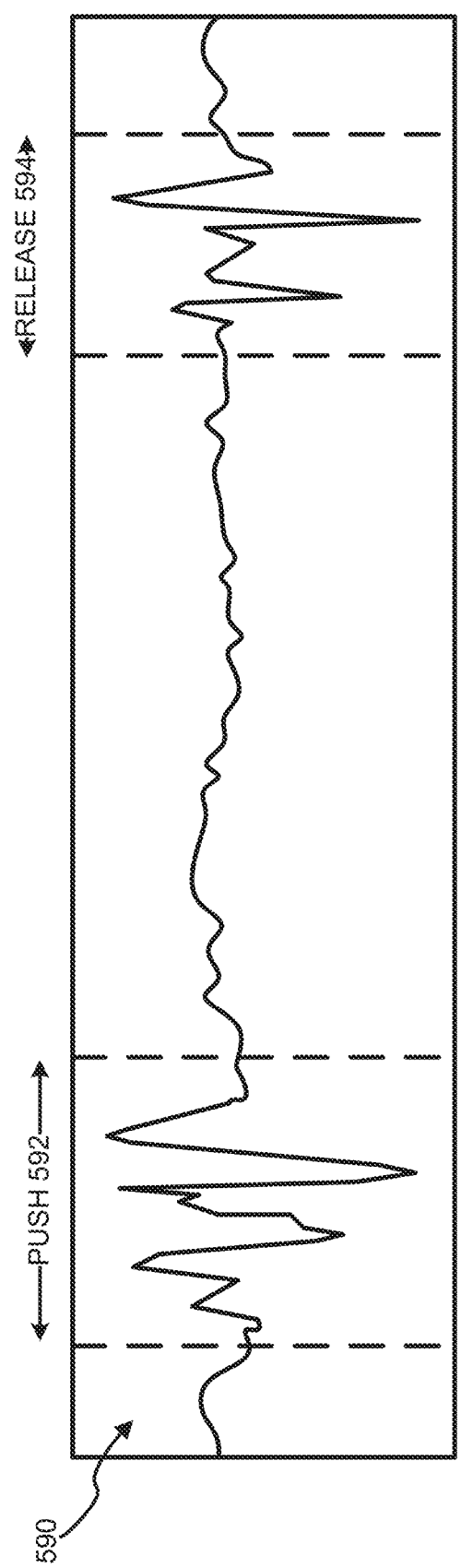
FIG. 5B illustrates an example vibration signal that may be generated by an additional button vibrational input element, in accordance with one or more example embodiments.

A vibration signal 590 generated by the movement of at least one of the vibration structure 502 and the weight 504 as part of a button vibrational input element are shown in FIG. 5B. A first portion 592 of the vibration signal 590 may correspond to a push action with respect to the vibration structure 502 and a second portion 594 of the vibrational signal 590 may correspond to a release action with respect to the vibration structure 502 The vibration signal 590 generated by the structure in FIG. 5A and as shown in FIG. 5B is distinguishable from the vibration signal 490 shown in FIG. 4E that is generated by the structure in FIG. 4D. In various examples, a device may have multiple buttons that may be distinguishable not only based on the position of the buttons on the device, but by the actual shape of vibration structures and/or weights actuated by the button. Two buttons with different structural features may thus be placed next to each other in a device, and the vibration signals generated by the two buttons may be distinguished and used to activate different actions based on the different vibration signals generated by the different button vibrational input elements.

Figure 6A:
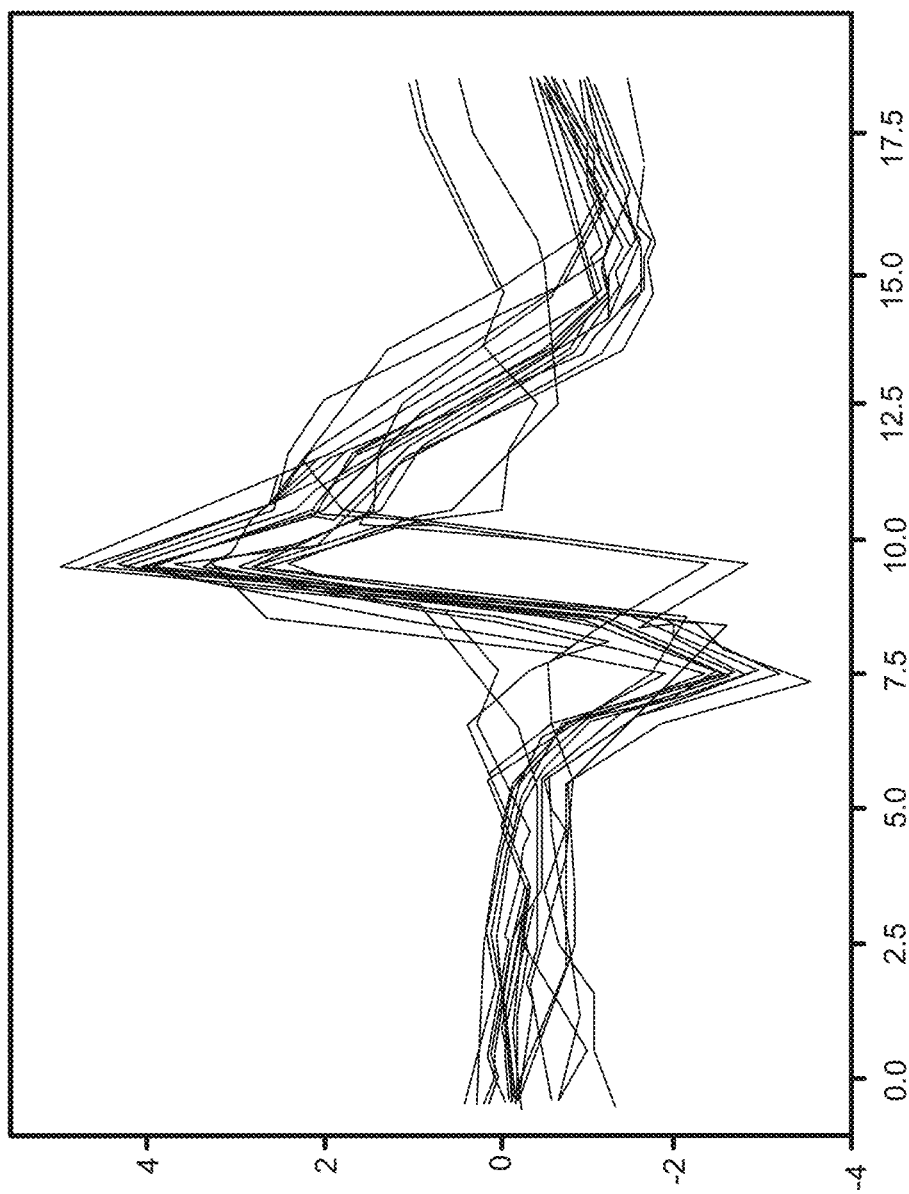
FIG. 6A illustrates aspects of button vibrational input element calibration, in accordance with one or more example embodiments.
Figure 6B:
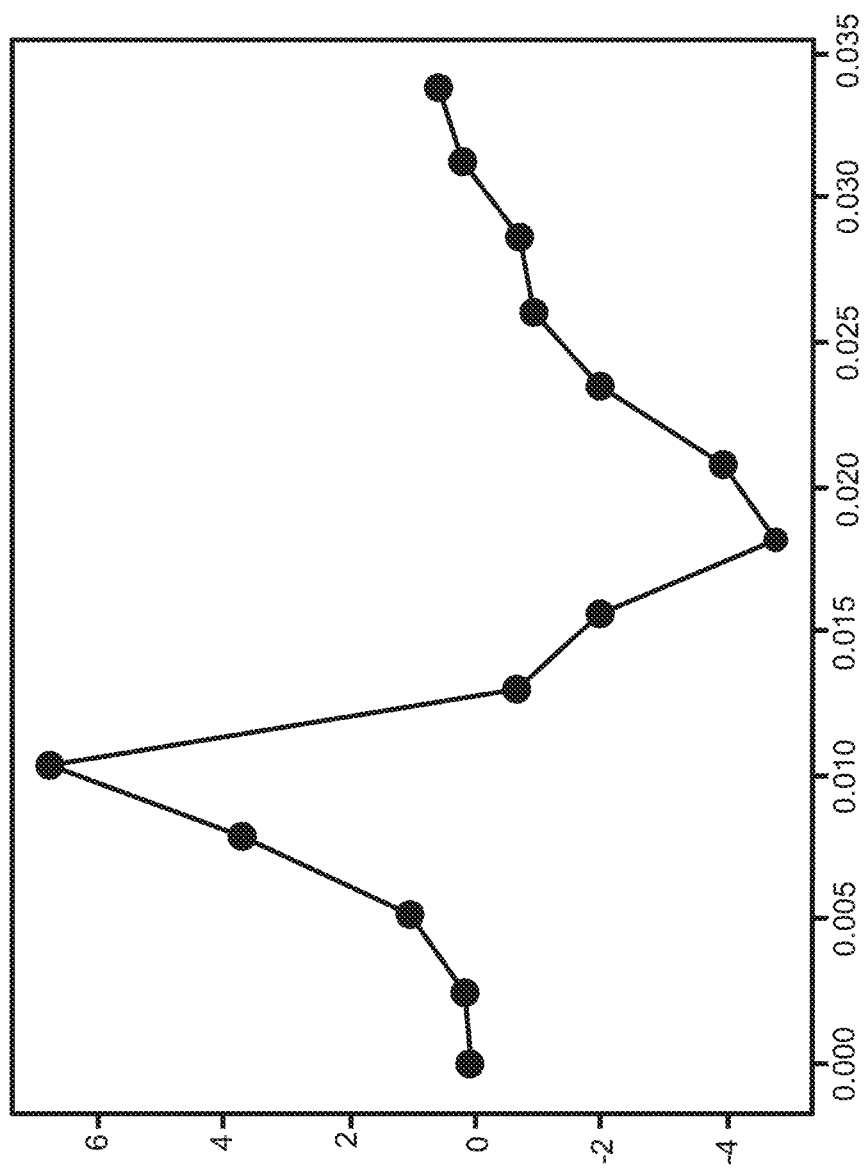
FIG. 6B illustrates a vibration profile that may be generated for the vibrational input element during calibration, in accordance with one or more example embodiments.

FIG. 6A illustrates aspects of button vibrational input element calibration, in accordance with various embodiments. In order to allow a device to distinguish vibration signals received from a vibrational input element from other random signals, various different calibration systems and procedures may be used. In some embodiments, the vibrational input system 132 may be put into a calibration mode to detect signals from a specific vibrational input element. For example, the vibrational input system 132 may be configured to monitor the signals generated by an accelerometer for five different distinct vibrational input elements. During one type of calibration, a user may be asked to repeat an action a specified number of times (e.g. seven times or ten times). The signals received from those inputs may be used to generate templates, such as vibration profiles, which account for the variations in signals possible for a single vibrational input element. For example, FIG. 6A illustrates a series of inputs associated with a single vibrational input element, and FIG. 6B illustrates a vibration profile that may be generated based on the sensor data shown in FIG. 6A for the vibrational input element during calibration. For a push-button vibrational input element, a user may be asked to press and release the vibrational input element a number of times. For a gear vibrational input element, a user may be asked to roll the gear in one direction for a certain distance or rotation (e.g. one revolution, two revolutions, across a threshold number of "teeth", etc.), and then to roll the gear in the opposite direction for another threshold distance or number of rotations. This may be repeated for each vibrational input element of a device to generate vibration profiles for each element. The vibrational input system 132 may analyze the vibration profiles to confirm that different vibrational input elements produce vibrations that are sufficiently distinct to allow the vibrational input system 132 to distinguish between actuation of the different vibrational input elements. In various examples, the vibrational input system 132 may inform a user that certain vibrational input elements do not generate sufficiently distinct signals, and will therefore be assigned to the same action when the corresponding vibration profile is detected (e.g. the same action within a game or user interface).

In addition to the calibration procedure described above for matching detected vibration patterns to vibrational input elements, other methods may be used as well. In some embodiments, a neural network or other machine learning process may be used to match vibrational signals with actuation of a corresponding vibrational input element.

Figure 6C:
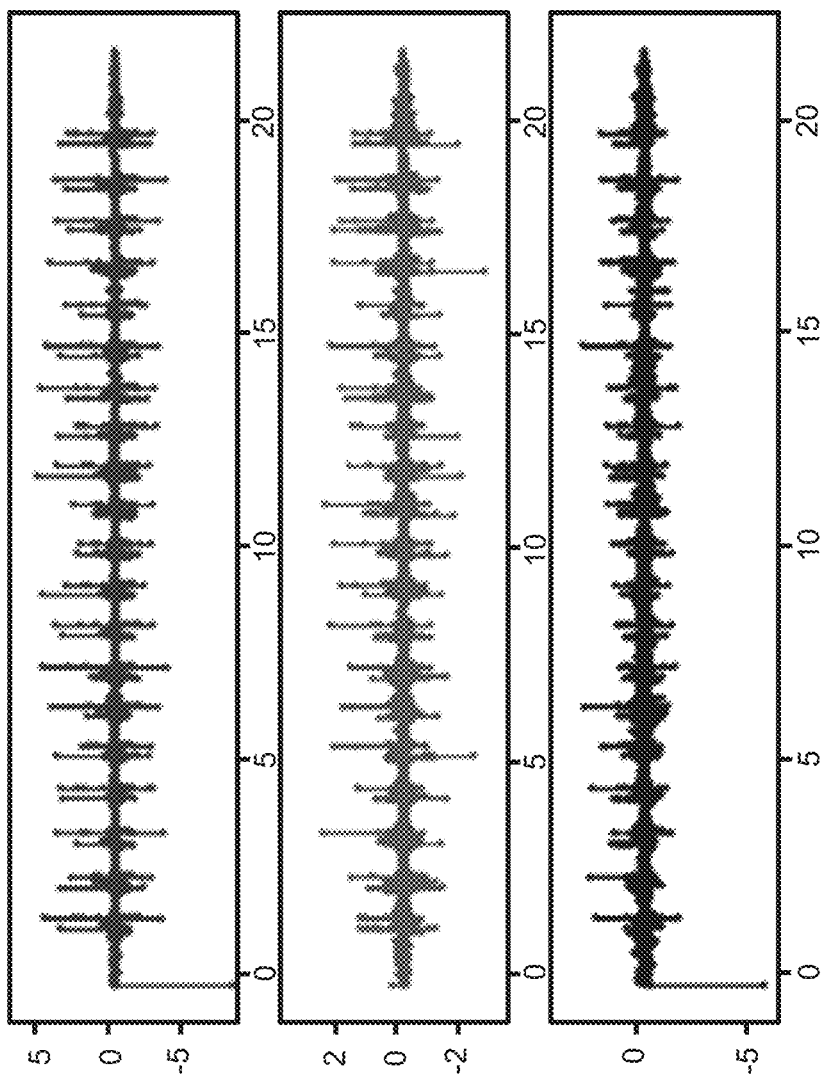
FIG. 6C illustrates signals generated by repeated inputs for a single vibrational input element for repeated push and release actions, in accordance with one or more example embodiments
Figure 6D:
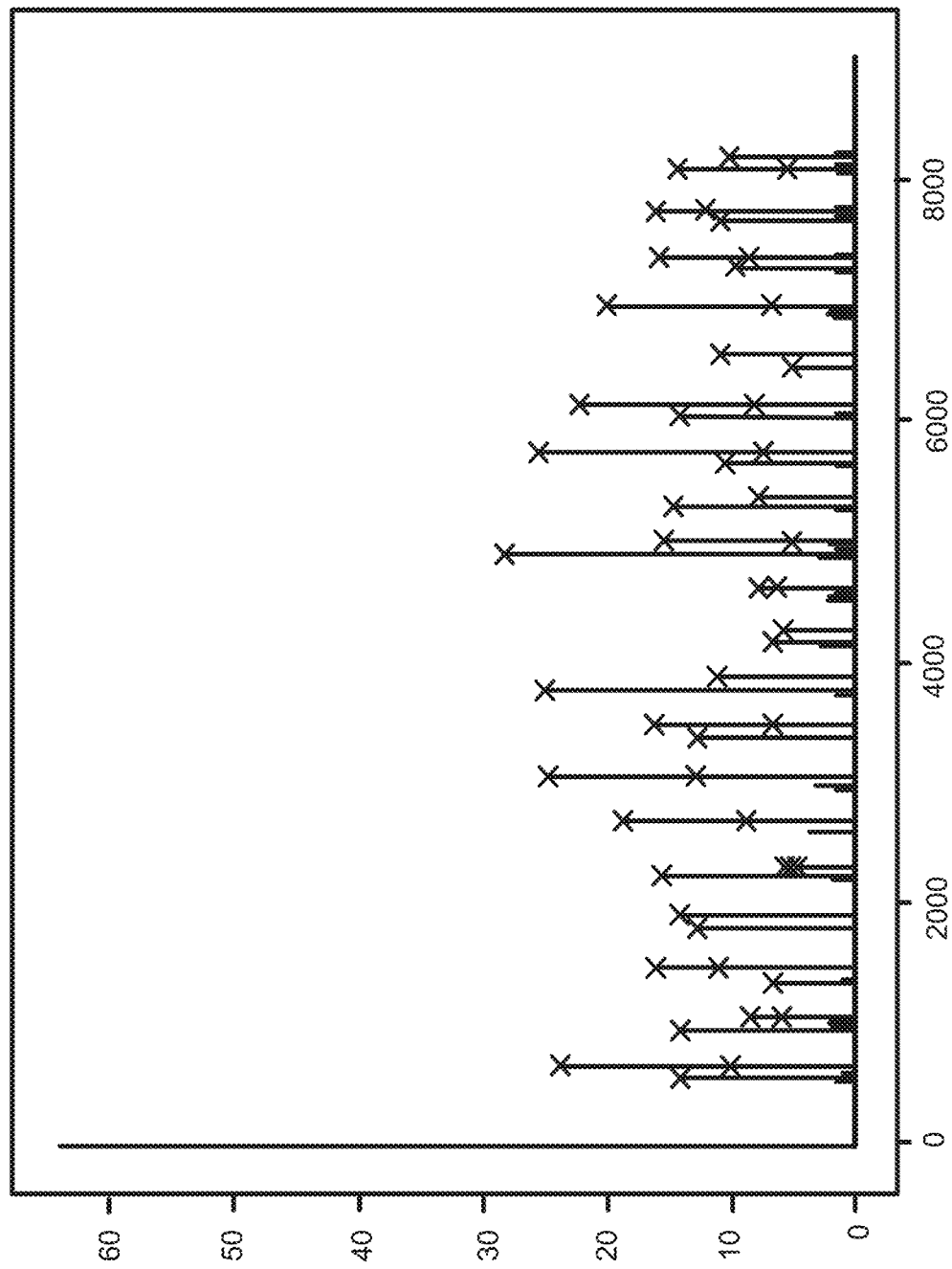
FIG. 6D illustrates segmentations of the signals from FIG. 6C amplitude and local maxima of the segmented signals, in accordance with one or more example embodiments.

In one embodiment, signals generated by repeated inputs for a single vibrational input element are collected (e.g. repeated push and release actions as illustrated in FIG. 6C). The repeated data may then be processed into data for a single action (e.g. a push action for a button vibrational input element). The different instances of the action are then segmented by amplitude and local maxima, as illustrated by FIG. 6D, with a subset of the data used to generate vibration profiles or a classifier for the associated vibrational input element.

Figure 7A:
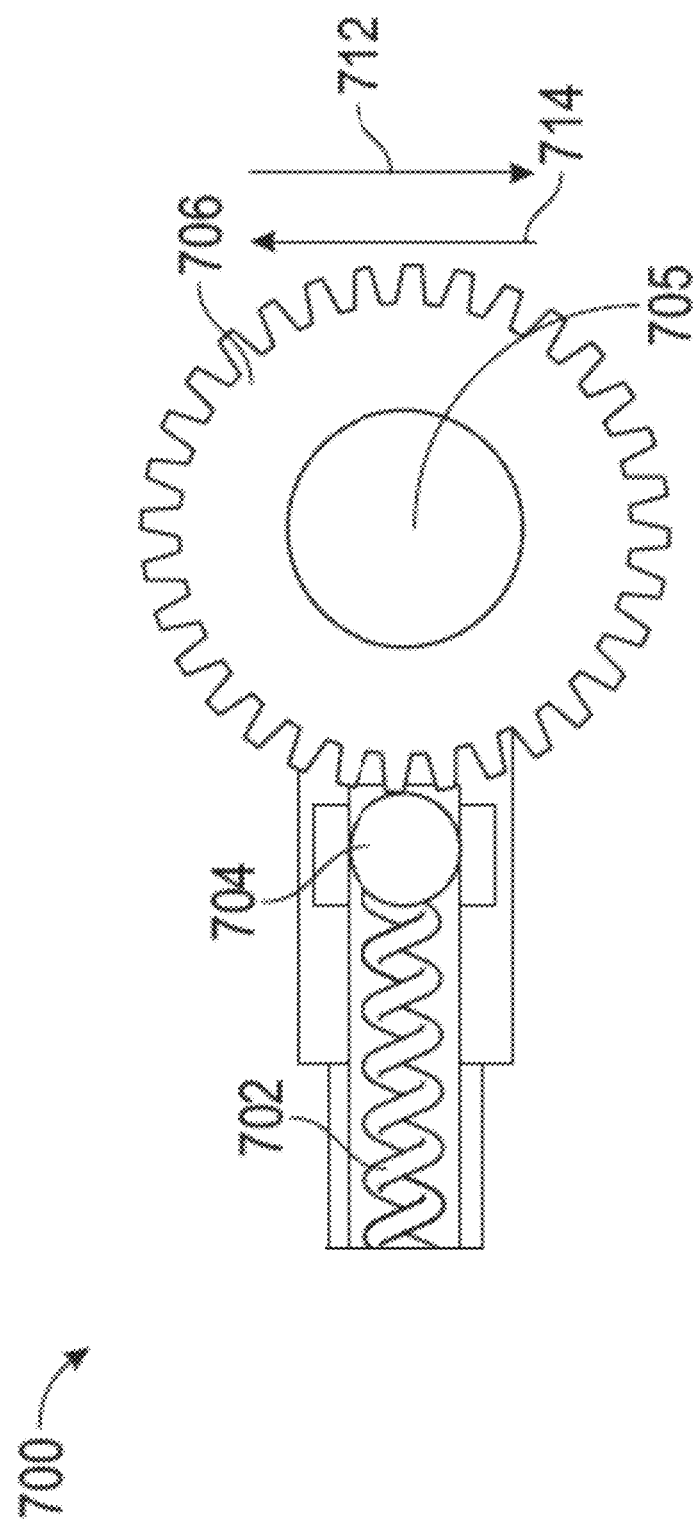
FIG. 7A illustrates aspects of gear vibrational input element, in accordance with one or more example embodiments.

FIG. 7A illustrates aspects of gear vibrational input element 700, in accordance with embodiments described herein. As illustrated by FIG. 7A, the gear vibrational input element 700 includes a gear 706 within a housing, and a vibration spring 702 attached to a weight 704. Gear 706 may rotate around center pin 705 in both of directions 712 and 710 to generate a vibration signal from the interaction of weight 704 and the surface of gear 706. Gear 706 can be physically attached to a center pin 705 or a similar attachment, which allows the gear 706 to physically revolve around center pin 705. Center pin 705 is physically attached to a structure which maintains a relative position to the case coupled to a device or a body of the device, and keeps a center of gear 706 in a fixed position relative to the device as gear 706 rotates. Teeth or surface portions of gear 706 physically touch weight 704. As gear 706 turns, the connection between gear 706 and weight 704 may be periodic, depending on the force exerted by weight 704 and the shape of the surface of gear 706. Vibration spring 702 is physically attached to weight 704 and attached to wall of a housing of the vibrational input element 700. The housing may be directly or indirectly connected to at least one sensor, such as an accelerometer. Just as described above for the button embodiment, the vibration spring 702 is not directly coupled to the sensor, but the physical structure of the housing of the vibrational input element 700 conveys mechanical vibrations from the weight 704 and the vibration spring 702 through the physical structure of the housing and/or body of the client device to the sensor. These physical structures may include a case that surrounds a portion of a body of a smartphone but are not permanently attached, so long as the physical structures of the case are sufficient to convey the mechanical vibrations produced during actuation of the vibrational input element 700 in a repeatable manner to a sensor of a client device.

Figure 7B:
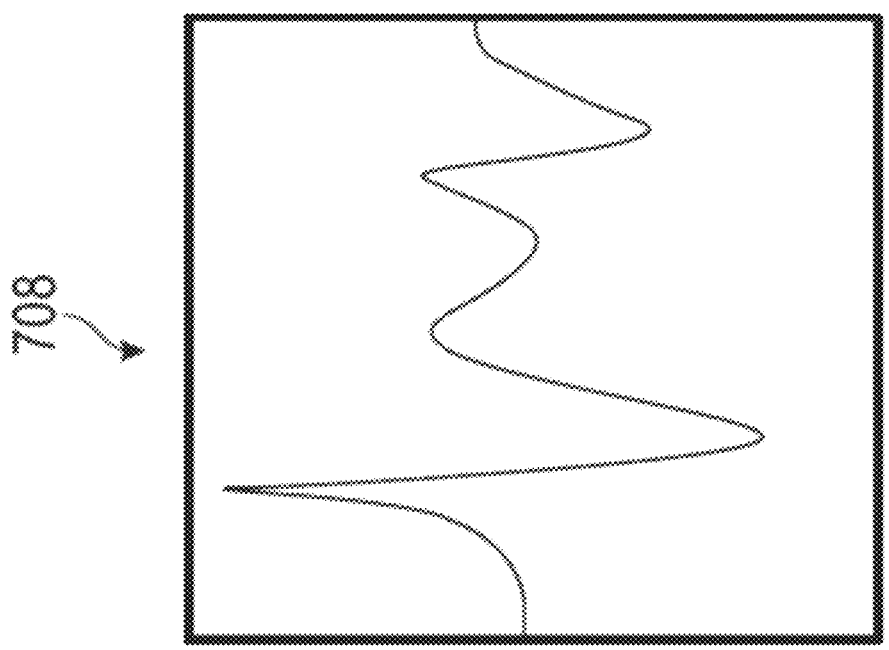
FIG. 7B illustrates an example vibrational signal that may be generated by a gear vibrational input element, in accordance with one or more example embodiments.
Figure 7C:
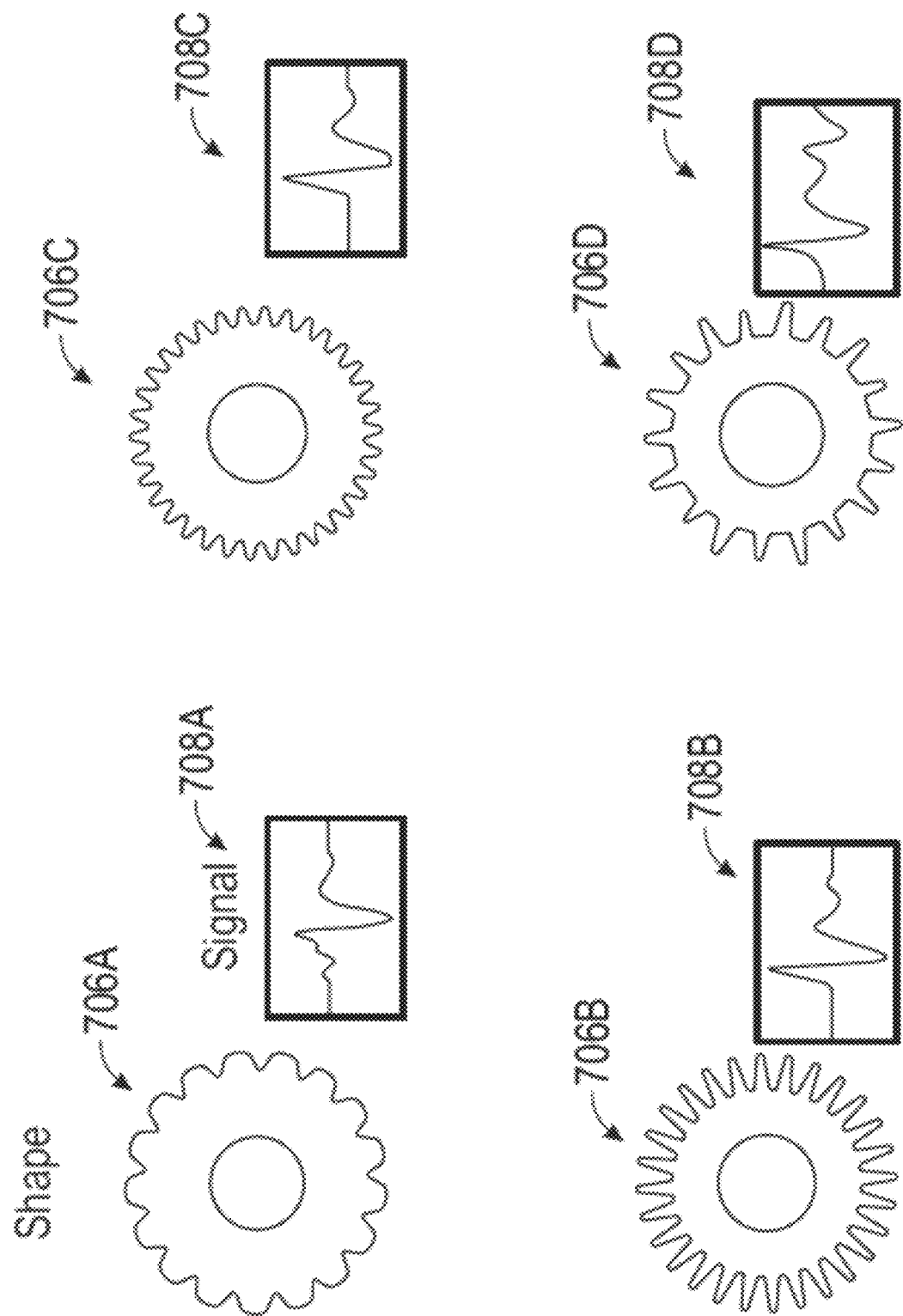
FIG. 7C illustrates four different possible patterns of teeth that may be used with a gear vibrational input element and the associated distinguishable vibration patterns for each pattern of teeth, in accordance with one or more example embodiments.

FIG. 7B illustrates an example vibrational signal 708 that may be generated from a rotation over a single "tooth" or pattern in the surface of the gear 706 by the interaction with the weight 704. Vibrational signal 708 is received at an accelerometer of a client device after a physical action or vibration travels from the vibration spring 702 and the weight 704 through the physical coupling of the mechanical structures to a sensor. FIG. 7C illustrates four different possible surface patterns that may be used with a gear 706, shown as gears 706A-D, and associated distinguishable vibration patterns for each gear shown as vibration patterns 708A-D. Depending on the sensitivity of the sensor(s) of a client device, some embodiments may include four such gear vibrational input elements attached to a single client device. Some embodiments may further be able to distinguish between gears 706 with the same surface pattern which are located in relation to different positions of a client device, again based on a sensitivity of one or more sensors of the client device. In other embodiments, where the patterns are not distinguishable, a client device may perform the same one or more actions in response to actuation of two different vibrational input elements. While the example embodiments each illustrate gears 706 with uniformly periodic structures around the wheel, in some embodiments, variations in the patterns on the wheel enable the vibration signals analyzed from an accelerometer to determine the position of a wheel, and to modify software responses based on the wheel position. For example, in one embodiment, the teeth may get larger from one position on the wheel to another position around the wheel, and then get smaller around the circumference to the initial starting point. In other embodiments, any such variations may be present.

Figure 8A:
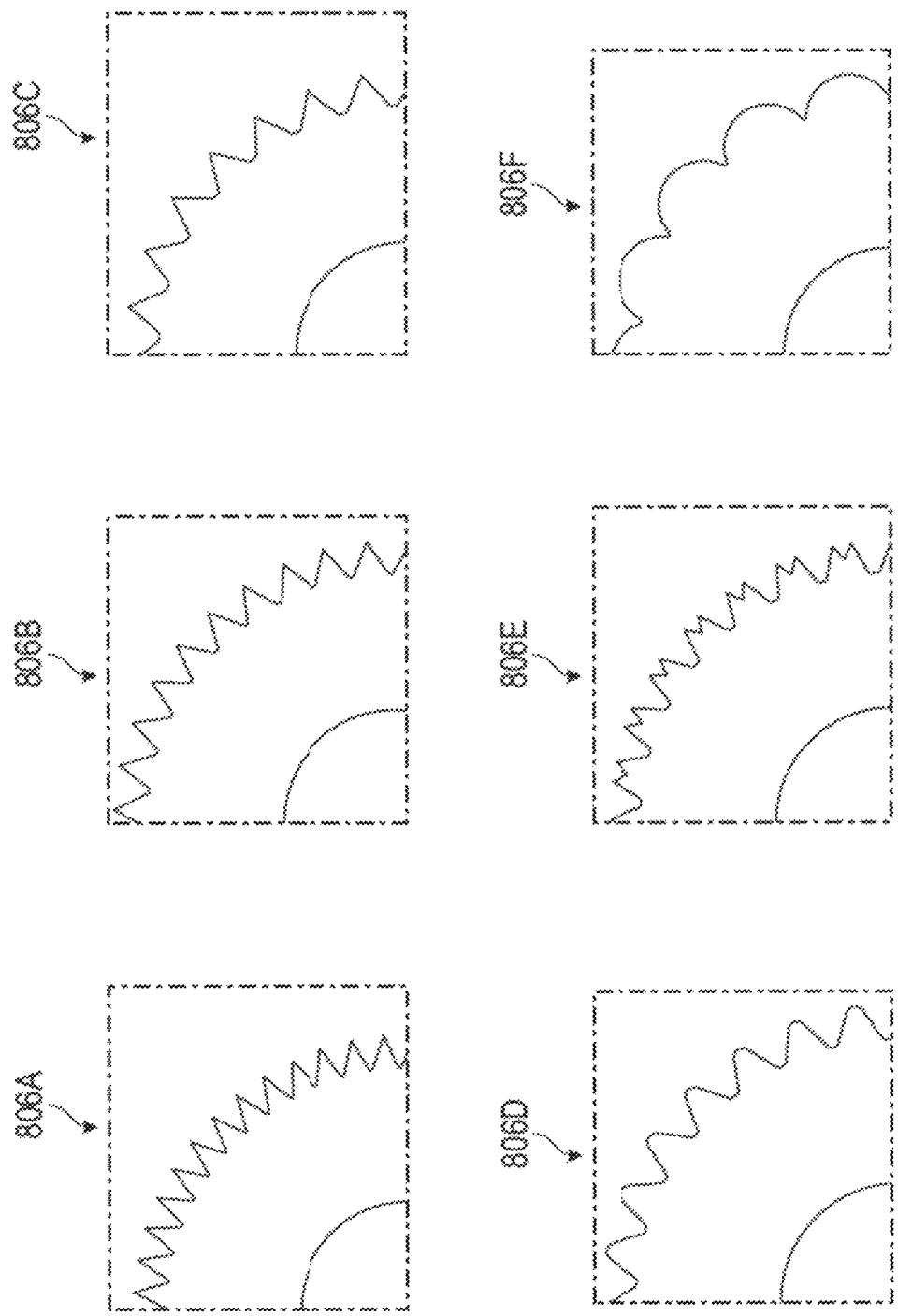
FIG. 8A illustrates aspects of shapes of teeth of a gear vibrational input element, in accordance with one or more example embodiments.
Figure 8B:
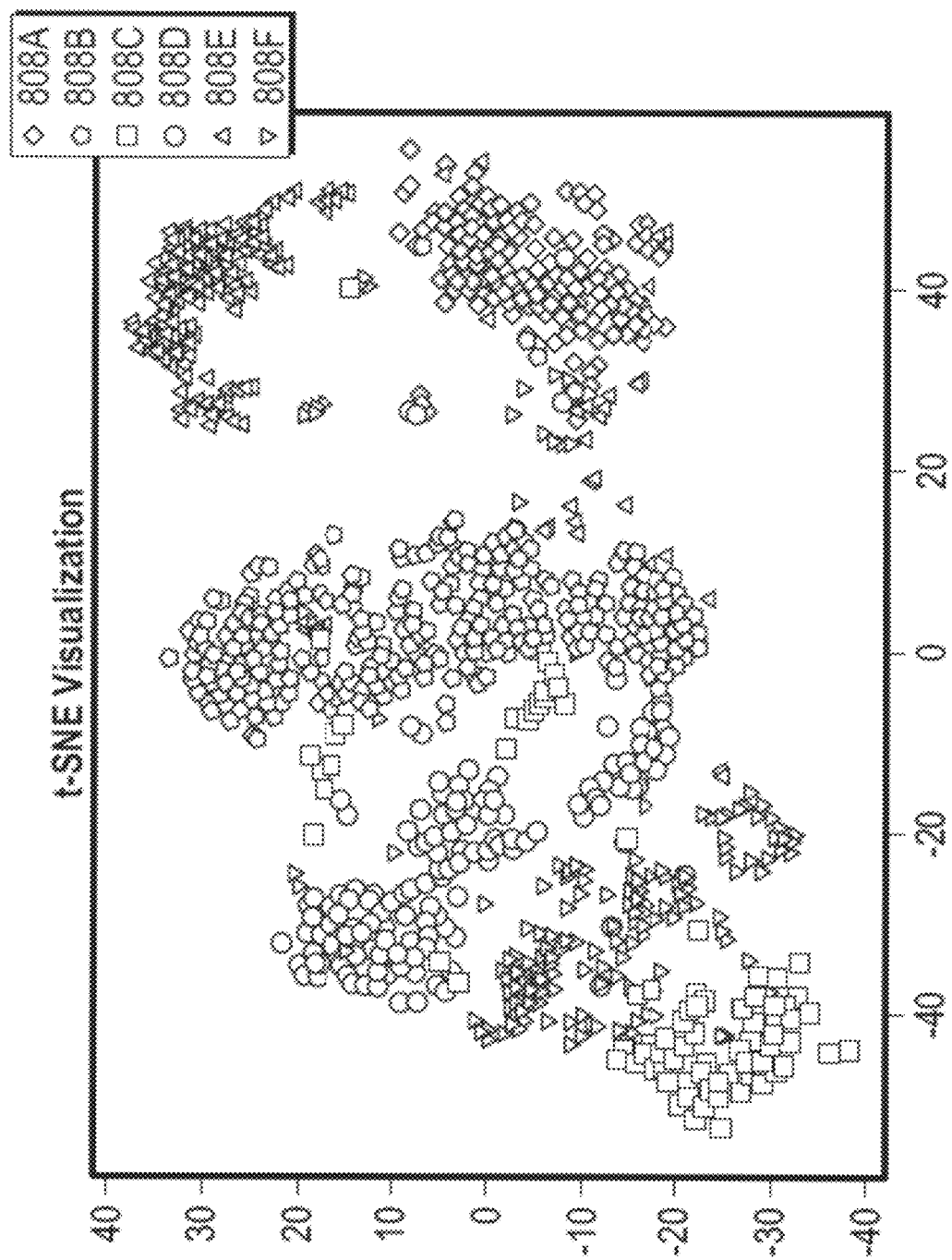
FIG. 8B illustrates how gear vibrational input elements having different shaped teeth have different characteristics, in accordance with one or more example embodiments.

FIG. 8A illustrates aspects of shapes of teeth of a gear vibrational input element, in accordance with embodiments described herein, and FIG. 8B illustrates how certain characteristics of the different gears 806A, 806B, 806C, 806D, 806E and/or 806F may be grouped so that vibrational input system 132 may distinguish between corresponding vibrational signals 808A, 808B, 808C, 808D, 808E, and/or 808F generated by different gears 806A, 806B, 806C, 806D, 806E and/or 806F.

As described above, the different gears 806A, 806B, 806C, 806D, 806E and/or 806F may be located within a case removably attached to a client device or a body of a client device and may be calibrated in different ways. Once some or all of the vibrational input elements attached to a client device are calibrated, the vibrational input system 132 may be configured to associate vibration signals with different applications or user interface actions. For example, within a map application, a vibration signal associated with a gear element may be used to initiate a zoom in action in one rotation direction, and a zoom out action in another rotation direction. If multiple gear elements are present, a second gear 806 may be used to pan along a first axis, and a third gear 806 may be used to pan along a second axis orthogonal to the first axis. In some embodiments, such the actions performed in response to actuation of the different gears 806 may be automatically determined by the vibrational input system 132. In additional embodiments, a user may specifi-cally assign or update such actions in a custom fashion. Similarly, on the same client device, when a game application is open, the vibrational input elements may be associated with game specific actions that are different from the map application actions. The actions performed with respect to actuation of the vibrational input elements in relation to the game application may be either assigned by the vibrational input system 132, or set by a user. The actions taken by a system in response to detected vibrations may thus be application or context specific to various interfaces of a client device.

As described in the calibration above, the detection of a vibration signal may be a simple association between a template and a detected vibration. In other embodiments, more complex associations may be made between a single vibrational input element and the corresponding action. For example, in a musical application, the volume and quality of the sound generated in relation to the musical application may be associated with complex details of the actual detected vibration. For example, calibration procedures may be performed in conjunction with a specific vibrational input element, to distinguish between a strong press or a weak press. In additional examples, an action may be taken when a press vibration is received and then the action may be reversed when a release vibration of the same vibrational input element is detected. In some embodiments, a basic action, such as selection of a particular musical note, may be performed using general vibration profiles, but secondary characteristics of the note (e.g. warble, timbre, etc.) may be based on specific details of the actual detected vibrational input. Additionally, detection of a vibrational input may be combined with other inputs to create combination-based actions. For example, a blowing signal received at a microphone may be combined with a vibrational input signal to further create a complex interaction resulting in a note with a particular loudness, pitch, and timbre. Combinations of various vibrational input elements attached to a client device may thus be used in a variety of ways to create complex input and output interactions. In some embodiments, the power consumption of the vibrational input elements is minimal, such as at or near zero Watts, because the vibrational input elements are simply generating vibrations mechanically without the addition of electrical power. Further, any increase in power usage of sensors of the client device in relation to detecting vibrations produced by the vibrational input elements is negligible since the sensors are already set to operate independent of the vibrational input elements. Increased resource usage associated with monitoring vibrations received at the sensors may be minimal in relation to the power required of the operation of electronic input elements that are coupled to a source of electrical power.

Figure 9:
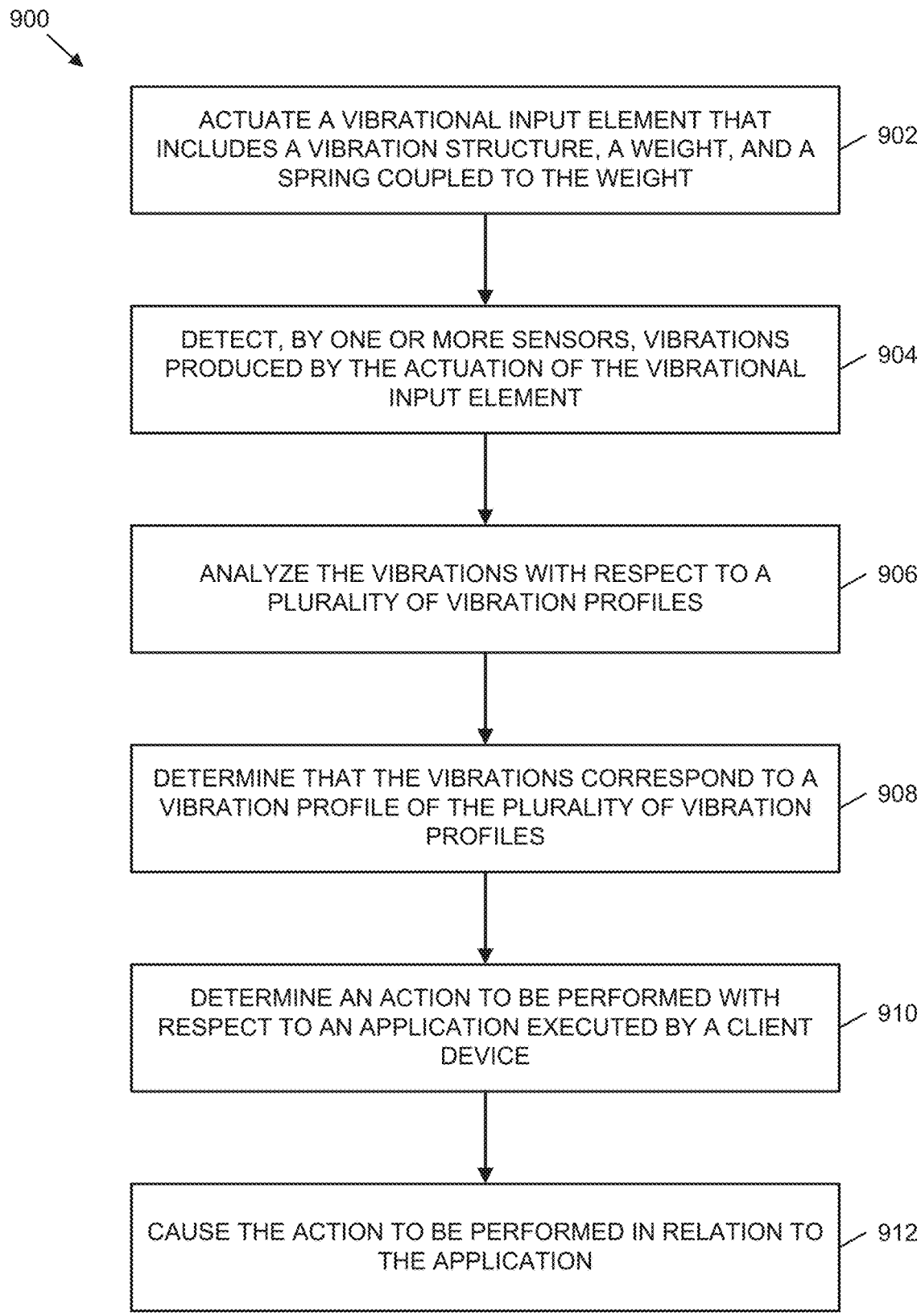
FIG. 9 is a flow diagram illustrating an example method to use vibrational input elements to perform an action in relation to a computing device application, in accordance with one or more example embodiments.

FIG. 9 is a flow diagram illustrating an example method 900 to use vibrational input elements to perform an action in relation to a computing device application, in accordance with one or more example embodiments. The method 900 may include, at 902, actuating a vibrational input element that includes a vibration structure, a weight, and a spring coupled to the weight. In various examples, contact between the vibration structure and the weight may cause at least the spring to vibrate. The weight may vibrate in additional examples. The vibrational input element may include a button vibrational input element that causes contact between the vibration structure and the weight in response to a push and/or release of a button of the vibrational input element. In these scenarios, the vibration structure may have a shape including at least one tooth. Additionally, the vibrational input element may include a wheel or gear vibrational input element that causes vibrations to be produced as the gear is rotated around a pin located in a center region of the gear by a user and the edges of the gear contact the weight. The gear may include a number of teeth disposed around the edge of the gear. In various examples, the vibrational input element may be one of a plurality of vibrational input elements that are included in a housing. The housing may be part of a case that is removable attached to at least a portion of a mobile computing device to provide protection for the mobile computing device. Further, the housing may be part of a body of the mobile computing device and thus be integrated as part of the mobile computing device.

In addition, the method 900 may include, at operation 904, detecting, by one or more sensors, vibrations produced by actuation of the vibrational input element. In one or more illustrative examples, the one or more sensors may include at least one accelerometer. At operation 906, the method 900 may include analyzing the vibrations produced by actuation of the vibrational input element with respect to a plurality of vibration profiles. Each of the vibration profiles may correspond to vibrations that are produced by actuation of a plurality of vibrational input elements. In various examples, the vibration profiles may be determined during a calibration process for the computing device. In various examples, multiple calibration processes may be performed for each vibrational input element.

The analysis of the vibrations produced by actuation of the vibrational input element with respect to the vibration profiles may include comparing a pattern of the vibrations to a corresponding pattern of each of the vibration profiles. In one or more illustrative examples, a measure of similarity may be produced indicating an amount of similarity between the vibration pattern produced by actuation of the vibrational input element and vibrations patterns included in a respective vibration profile. In various examples, the vibration pattern produced by actuation of the vibrational input element may be compared to at least a portion of a library of previously determined vibration profiles to determine measures of similarity between the respective vibration profiles and the vibration pattern of the vibrational input element.

Further, at operation 908, the method 900 may include determining that the vibrations produced by actuation of the vibrational input element correspond to a respective vibration profile of the plurality of vibration profiles. For example, an amount of similarity between the vibration pattern produced by actuation of the vibrational input element and the vibration pattern of the vibration profile may be above a threshold amount of similarity. In additional examples, a vibration profile having a greatest amount of similarity with the vibration pattern produced by actuation of the vibrational input element may be selected as the vibration profile that corresponds to the vibration pattern of the vibrational input element.

The method 900 may also include, at operation 910, determining an action to be performed with respect to an application executed by the computing device. In various examples, a vibrational input system executed by the computing device may determine an application of the computing device that is currently open and/or active. An open and/or active application may include an application that is being executed by the computing device to accept input at a given time via one or more input devices of the computing device. For example, a first application may be executed to receive input via one or more input devices of the computing device during a first period of time and a second application may be executed to receive input via one or more input devices of the computing device during a second period of time. The computing device may display one or more user interfaces of an open and/or active application indicating that the computing device is processing input with respect to the open and/or active application. In one or more examples, each vibration profile may be associated with at least one action that is to be performed by the computing device with respect to an open and/or active application. In one or more examples, each vibration profile may be associated with different actions for different applications. To illustrate, during a period of time that a first application executed by the computing device is open and/or active, a vibration profile may be associated with one or more first actions. Further, during a period of time that a second application executed by the computing device is open and/or active, the vibration profile may be associated with one or more second actions that may be different from the one or more first actions.

At operation 912, the method 900 may include causing the action determined in relation to operation 910 to be performed in relation to the application. That is, after determining an application that is currently open and/or actively being executed by the computing device and determining the action that is associated with the vibration profile corresponding to the detected vibration pattern produced by actuation of the vibrational input element, the computing device may cause the action to be performed. In one or more examples, the action may correspond to selection of a user interface element, movement of a user interface element, modifying a view of a user interface, producing one or more sounds, modifying content shown in a user interface, causing content shown in a user interface to be played, or one or more combinations thereof.

Figure 10:
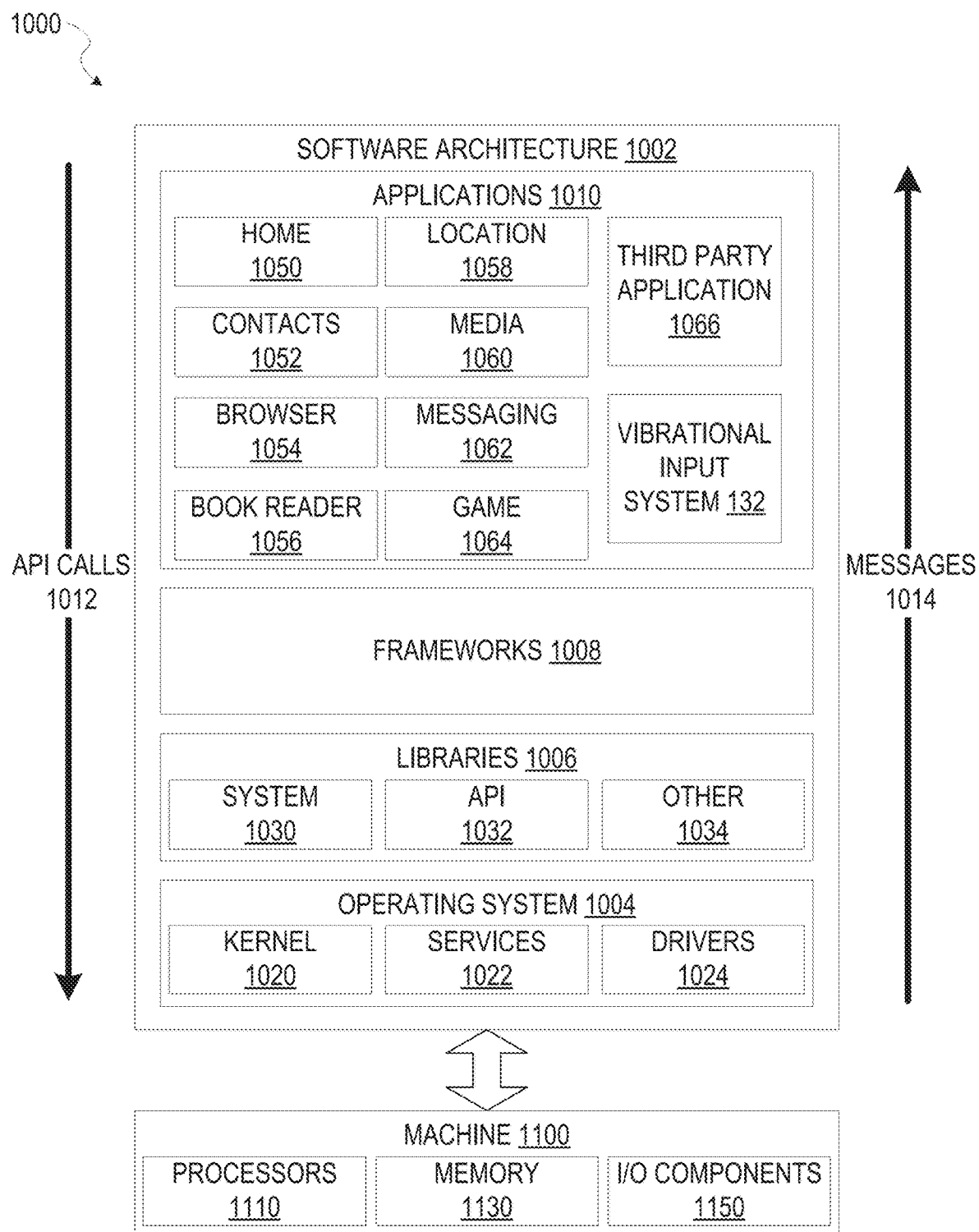
FIG. 10 is a block diagram illustrating an example of a software architecture that may be installed on a machine and used to implement functionality with vibrational input elements, according to some example embodiments.

FIG. 10 is a block diagram of a system 1000 including an architecture of software 1002, which can be installed on any one or more of the devices described above. Such software may be used both with calibrating and detecting signals from vibrational input elements, and for associated detected signals with actions in various applications and user interfaces. FIG. 10 is merely a non-limiting example of a software architecture 1002, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application 1010 developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1066 can invoke the API calls 1012 provided by the operating system 1004 to facilitate functionality described herein.

Some embodiments may particularly include a vibrational input system 132. In certain embodiments, this may be a stand-alone application that operates to manage calibration and detection of vibrational signals from vibrational input elements, and to initiate actions based on detected inputs. In other embodiments, this functionality may be integrated with another application or system software such as a game application 1064 or aspects of frameworks 1008 or libraries 1006. Vibrational input system 132 may have associations with both hardware and software, and may be used to provide inputs for a camera device of machine 1100, communication with a server system via I/O components 1150, and receipt and storage of received media collections in memory 1130 in addition to interactions with various software or UI elements of a device. Presentation of content and user inputs associated with content may be generated by vibrational input system 132 using different frameworks 1008, library 1006 elements, or operating system 1004 elements operating on a machine 1100.

Figure 11:
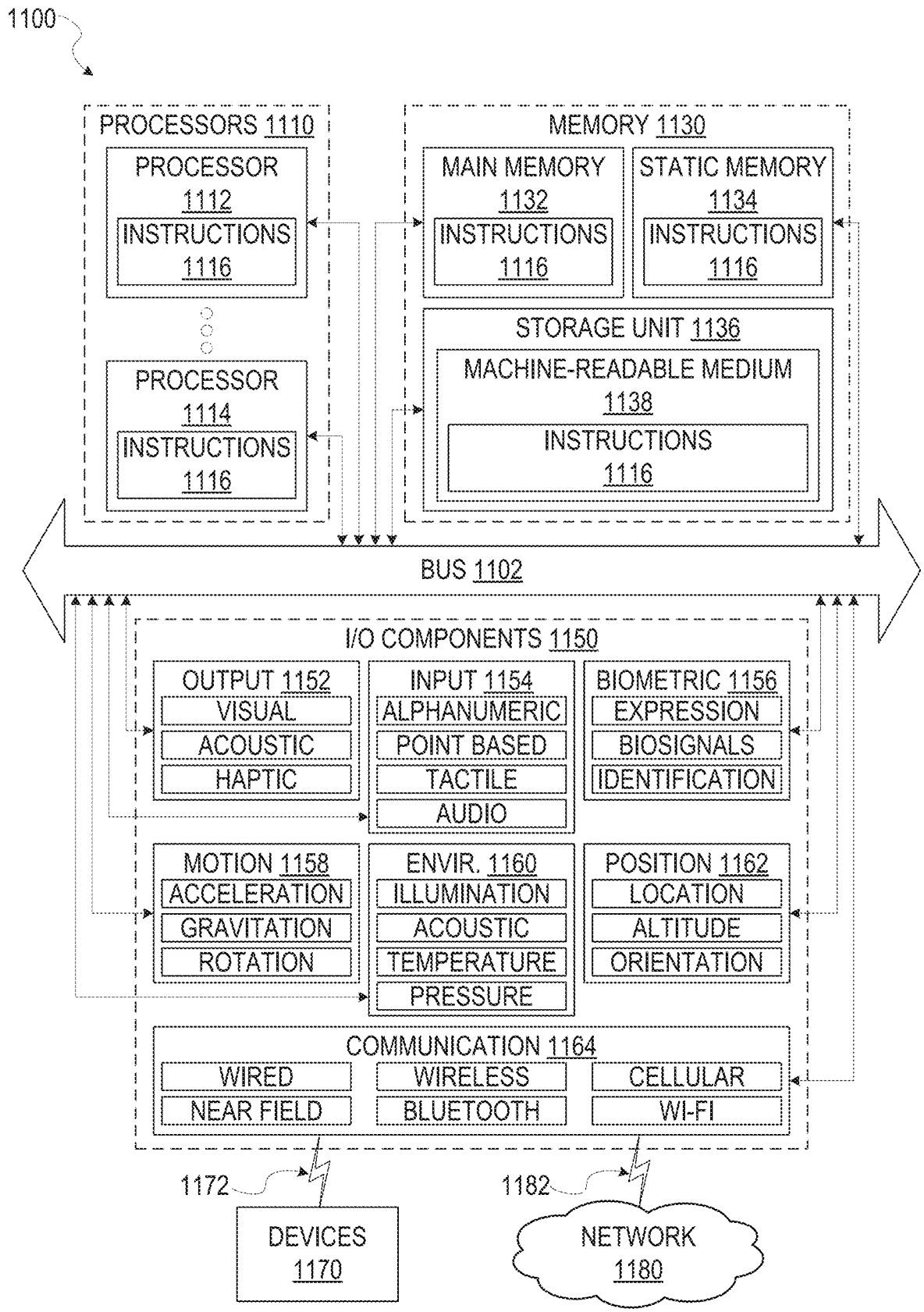
FIG. 11 illustrates a diagrammatic representation of a machine in the form of a mobile device or other such systems which may use vibrational input elements and within which a set of instructions may be executed for causing the machine to perform any one or more of the methodologies discussed herein, according to various example embodiments.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 10 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server or a client device in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136, accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touchscreen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:
1. A device comprising:
a housing that includes a cavity;
a vibrational input element disposed in the cavity, the vibrational input element including:
  a vibration structure,
  a weight that is configured to contact the vibration structure in response to actuation of the vibrational input element, and
  a spring coupled to the weight and to a wall of the cavity, the spring being configured to produce vibra- tions in response to contact between the vibration structure and the weight; and an accelerometer configured to detect the vibrations produced by the actuation of the vibrational input element.

2. The device of claim 1, wherein:
the vibrational input element includes a body and a button coupled to the body;
at least a portion of the button extends outside of the cavity; and
the vibration structure is coupled to the body.

3. The device of claim 2, comprising an additional spring that is coupled to the body, and wherein the spring is disposed perpendicular in relation to the body and in relation to the additional spring.

4. The device of claim 3, wherein a first spring constant of the spring is different from a second spring constant of the additional spring.

5. The device of claim 1, wherein the vibration structure comprises a gear having a number of teeth disposed around an edge, the vibration structure being configured to rotate around a pin located at a center region of the vibration structure.

6. The device of claim 1, comprising:
an additional vibrational input element disposed within an additional cavity of the housing, the additional vibrational input element including:
an additional vibration structure;
an additional weight that is configured to contact the additional vibration structure and produce additional vibrations in response to actuation of the additional vibrational input element; and
an additional spring coupled to the additional weight and to an additional wall of the additional cavity, the additional spring being configured to vibrate in response to contact between the additional vibration structure and the additional weight.

7. The device of claim 6, wherein an additional shape of the additional vibration structure is different from a shape of the vibration structure.

8. The device of claim 7, wherein:
the vibrational input element includes a body, a button coupled to the body, and the shape of the vibration structure includes a single tooth coupled to the body; and
the additional vibrational input element includes an additional body, an additional button coupled to the body, and the additional shape of the additional vibration structure includes multiple teeth coupled to the additional body.

9. The device of claim 7, wherein:
the vibrational input element includes a body, a button coupled to the body, and the shape of the vibration structure includes at least one tooth coupled to the body; and
the additional shape of the additional vibration structure corresponds to a gear having a number of teeth disposed around an edge of the gear, the additional vibration structure being configured to rotate around a pin located at a center region of the additional vibration structure.

10. The device of claim 1, wherein the housing is integrated with a body of a mobile computing device, the mobile computing device including at least one sensor configured to detect the vibrations produced by the actuation of the vibrational input element.

11. The device of claim 1, wherein the housing includes a case that is configured to removably couple to a mobile computing device.

12. A vibrational input element comprising:
a body;
a vibration structure being connected to the body or part of the body;
a weight that is configured to contact the vibration structure in response to actuation of the vibrational input element;
a first spring coupled to the weight, the first spring being configured to produce vibrations in response to contact between the vibration structure and the weight; and
a second spring that is coupled to the body, the second spring being disposed perpendicular in relation to the body and in relation to the first spring.

13. The vibrational input element of claim 12, wherein:
a button is coupled to the body;
the vibrational input element is disposed in a cavity; and
at least a portion of the button extends outside of the cavity.

14. The vibrational input element of claim 13, wherein the cavity is disposed in a housing of a client device.

15. The vibrational input element of claim 13, wherein the cavity is disposed in a case that is configured to be removably attached to a client device.

16. The vibrational input element of claim 13, wherein a first spring constant of the first spring is different from a second spring constant of the second spring.

17. The vibrational input element of claim 13, wherein the vibration structure comprises a single tooth.

18. The vibrational input element of claim 13, wherein the vibration structure comprises multiple teeth.

* * * * *